US009563216B1

(12) United States Patent
Barroso et al.

(10) Patent No.: US 9,563,216 B1
(45) Date of Patent: Feb. 7, 2017

(54) MANAGING POWER BETWEEN DATA CENTER LOADS

(71) Applicant: Google Inc., Mountain View, CA (US)

(72) Inventors: Luiz Andre Barroso, Los Altos Hills, CA (US); Christopher G. Malone, Mountain View, CA (US); Taliver Brooks Heath, Mountain View, CA (US); Nathaniel Edward Pettis, San Jose, CA (US); Stephanie Hua Taylor, Redwood City, CA (US); Michael C. Ryan, San Jose, CA (US)

(73) Assignee: Google Inc., Mountain View, CA (US)

( * ) Notice: Subject to any disclaimer, the term of this patent is extended or adjusted under 35 U.S.C. 154(b) by 584 days.

(21) Appl. No.: 14/084,835

(22) Filed: Nov. 20, 2013

Related U.S. Application Data

(60) Provisional application No. 61/783,576, filed on Mar. 14, 2013.

(51) Int. Cl.
*G06F 19/00* (2011.01)
*G05F 1/66* (2006.01)

(52) U.S. Cl.
CPC .................................... *G05F 1/66* (2013.01)

(58) Field of Classification Search
USPC ........................................................ 700/286
See application file for complete search history.

(56) References Cited

U.S. PATENT DOCUMENTS

| | | | | |
|---|---|---|---|---|
| 8,224,993 | B1 * | 7/2012 | Brandwine | G06F 1/3203 709/244 |
| 8,733,812 | B2 | 5/2014 | Slessman | |
| 8,756,441 | B1 | 6/2014 | Mullins et al. | |
| 8,761,955 | B2 | 6/2014 | Saigo et al. | |
| 8,762,522 | B2 | 6/2014 | Moon | |
| 8,765,528 | B2 | 7/2014 | Houle et al. | |
| 8,775,832 | B2 | 7/2014 | Artman et al. | |
| 2006/0161307 | A1 * | 7/2006 | Patel | F24F 11/0086 700/277 |

(Continued)

OTHER PUBLICATIONS

Lyengeaet al., Enrgy Consumption of ingormation techplogy Data Centers,Dec. 6, 2010, IBM, pp. 1-4.*

(Continued)

*Primary Examiner* — Kidest Bahta
(74) *Attorney, Agent, or Firm* — Fish & Richardson P.C.

(57) ABSTRACT

Techniques for managing power loads of a data center include electrically coupling a data center infrastructure power load and a data center IT power load in a power distribution system having a specified power capacity, the infrastructure power load including a plurality of infrastructure power loads associated with at least one of a data center cooling system, a data center lighting system, or a data center building management system, and the IT power load including a plurality of IT power loads associated with a plurality of rack-mounted computing devices; determining that a predicted amount of the IT power load is about equal to or greater than a threshold power value; throttling the infrastructure power load to reduce a portion of the power capacity used by the infrastructure power load; and based on throttling the infrastructure power load, increasing another portion of the power capacity available to the IT power load.

24 Claims, 8 Drawing Sheets

(56) References Cited

U.S. PATENT DOCUMENTS

| | | | | |
|---|---|---|---|---|
| 2006/0161794 | A1* | 7/2006 | Chiasson | G06F 1/28 713/300 |
| 2009/0070611 | A1* | 3/2009 | Bower, III | G06F 1/3203 713/322 |
| 2009/0216910 | A1* | 8/2009 | Duchesneau | G06F 9/5072 709/250 |
| 2009/0235097 | A1* | 9/2009 | Hamilton | G06F 1/3203 713/320 |
| 2010/0328849 | A1* | 12/2010 | Ewing | G06F 1/266 361/622 |
| 2011/0126206 | A1* | 5/2011 | Kato | G06F 1/206 718/103 |

OTHER PUBLICATIONS

Richard Sawyer, Calculating Total Power Requirements dor Data Centors, 2004, p. 1-10.*

* cited by examiner

| Units | Platform | Application | Power | Subtotal |
|---|---|---|---|---|
| 20 | Company XYZ, 500Mhz, 512Mb, etc. | Search | 350 | 7000 |
| 40 | Company XYZ, 666Mhz, 512Mb, etc. | Search | 375 | 15000 |
| 30 | Company XYZ, 500Mhz, 512Mb, etc. | Electronic Mail | 300 | 9000 |
| 20 | Company ABC, 500Mhz, 512Mb, etc. | Search | 300 | 6000 |
| | | | Total | 37000 |

MANAGING POWER BETWEEN DATA CENTER LOADS

CROSS REFERENCE TO RELATED APPLICATIONS

This application claims priority under 35 U.S.C. §119 to U.S. Provisional Patent Application Ser. No. 61/783,576, filed Mar. 14, 2013, and entitled "Managing Power Between Data Center Loads," the entire contents of which are incorporated by reference herein.

TECHNICAL BACKGROUND

This disclosure relates to systems and methods for managing power between data center loads, such as, for example, infrastructure power loads and information technology (IT) power loads.

BACKGROUND

Computer users often focus on the speed of computer microprocessors (e.g., megahertz and gigahertz). Many forget that this speed often comes with a cost—higher power consumption. For one or two home PCs, this extra power may be negligible when compared to the cost of running the many other electrical appliances in a home. But in data center applications, where thousands of microprocessors may be operated, electrical power requirements can be very important.

Power consumption is also, in effect, a double whammy. Not only must a data center operator pay for electricity to operate its many computers, but the operator must also pay to cool the computers. That is because, by simple laws of physics, all the power has to go somewhere, and that somewhere is, in the end, conversion into heat. A pair of microprocessors mounted on a single motherboard can draw hundreds of watts or more of power. Multiply that figure by several thousand (or tens of thousands) to account for the many computers in a large data center, and one can readily appreciate the amount of heat that can be generated. It is much like having a room filled with thousands of burning floodlights. The effects of power consumed by the critical load in the data center are often compounded when one incorporates all of the ancillary equipment required to support the critical load.

Thus, the cost of removing all of the heat can also be a major cost of operating large data centers. That cost typically involves the use of even more energy, in the form of electricity and natural gas, to operate chillers, condensers, pumps, fans, cooling towers, and other related components. Heat removal can also be important because, although microprocessors may not be as sensitive to heat as are people, increases in temperature can cause great increases in microprocessor errors and failures. In sum, a data center requires a large amount of electricity to power the critical load, and even more electricity to cool the load.

SUMMARY

In a general implementation according to the present disclosure, a method for managing power loads of a data center includes electrically coupling a data center infrastructure power load and a data center information technology (IT) power load in a data center power distribution system having a specified power capacity, the infrastructure power load including a plurality of infrastructure power loads associated with at least one of a data center cooling system, a data center lighting system, or a data center building management system, and the IT power load including a plurality of IT power loads associated with a plurality of rack-mounted computing devices in the data center; determining that a predicted amount of the IT power load is about equal to or greater than a threshold power value; based on the determination, throttling the infrastructure power load to reduce a portion of the power capacity used by the infrastructure power load; and based on throttling the infrastructure power load, increasing another portion of the power capacity available to the IT power load.

In a first aspect combinable with the general implementation, a sum of a peak of the infrastructure power load and a peak of the IT power load is greater than the specified power capacity.

In a second aspect combinable with any of the previous aspects, throttling the infrastructure power load includes determining an amount of power used by each of at least some of the plurality of infrastructure power loads; ranking the determined amounts of power from highest to lowest; and reducing a power consumption of one of the at least some of the plurality of infrastructure power loads associated with the highest ranking.

In a third aspect combinable with any of the previous aspects, reducing a power consumption of one of the at least some of the plurality of infrastructure power loads associated with the highest ranking includes at least one of reducing a power consumption of a chiller with a variable frequency drive; reducing a power consumption of a chiller by current limiting; turning off a chiller; or reducing a power consumption of one or more lights of the data center.

A fourth aspect combinable with any of the previous aspects further includes, subsequent to reducing the power consumption of the at least some of the plurality of infrastructure power loads associated with the highest ranking, monitoring a power draw of the infrastructure power load; and based on the monitored power draw being above a particular power draw, reducing a power consumption of another of the at least some of the plurality of infrastructure power loads associated with a next highest ranking.

In a fifth aspect combinable with any of the previous aspects, reducing a power consumption of another of the at least some of the plurality of infrastructure power loads associated with a next highest ranking includes at least one of: reducing a power consumption of a fan of a fan coil unit; or reducing a power consumption of a pump.

In a sixth aspect combinable with any of the previous aspects, throttling the infrastructure power load includes reducing the infrastructure power load by an amount substantially equal to or greater than an amount that the predicted amount of the IT power load exceeds the threshold power value.

In a seventh aspect combinable with any of the previous aspects, determining that a predicted amount of the IT power load is about equal to or greater than a threshold power value includes collecting historical data associated with the plurality of IT power loads; and determining the threshold power value based on the collected historical data.

In an eighth aspect combinable with any of the previous aspects, the historical data includes power usage data of the plurality of IT loads that is grouped in a plurality of time segments, the time segments including at least one of hours, days, weeks, or months.

In a ninth aspect combinable with any of the previous aspects, determining that a predicted amount of the IT power load is about equal to or greater than a threshold power value includes monitoring ambient conditions external to the data center; and determining the threshold power value based on the monitored ambient conditions.

A tenth aspect combinable with any of the previous aspects further includes installing an additional plurality of rack-mounted computing devices in the data center based on the monitored ambient conditions.

In an eleventh aspect combinable with any of the previous aspects, determining that a predicted amount of the IT power load is about equal to or greater than a threshold power value includes monitoring a plurality of computing loads received at the data center for processing by the plurality of rack-mounted computing devices; determining a required power usage to process the monitored plurality of computing loads; and prior to processing the monitored plurality of computing loads, determining that the IT power load that includes the required power usage, at least in part, exceeds the threshold power value.

A twelfth aspect combinable with any of the previous aspects further includes subsequent to a specified time duration after throttling the infrastructure power load to reduce the portion of the power capacity used by the infrastructure power load, increasing the infrastructure power load.

A thirteenth aspect combinable with any of the previous aspects further includes subsequent to increasing another portion of the power capacity available to the IT power load, monitoring an increased IT power load that is about equal to or greater than the threshold power value; determining that the IT power load is reduced to below the threshold power value; and increasing the infrastructure power load. based on the reduced IT power load.

In another general implementation, a data center power system includes a power distribution assembly that includes an input operable to electrically couple to a high voltage power source, the power distribution assembly including a specified power capacity; a data center infrastructure power load that is electrically coupled to the power distribution assembly and includes a plurality of infrastructure power loads associated with at least one of a data center cooling system, a data center lighting system, or a data center building management system; a data center information technology (IT) power load that is electrically coupled to the power distribution assembly and the infrastructure power load, the IT power load including a plurality of IT power loads associated with a plurality of rack-mounted computing devices in the data center; and a control system communicably coupled to the power distribution system. The control system is operable to perform operations including determining that a predicted amount of the IT power load is about equal to or greater than a threshold power value; based on the determination, throttling the infrastructure power load to reduce a portion of the power capacity used by the infrastructure power load; and based on throttling the infrastructure power load, increasing another portion of the power capacity available to the IT power load.

In a second aspect combinable with the general implementation, the power distribution assembly includes a plurality of power busses, each of the plurality of power busses electrically coupled to a portion of the plurality of infrastructure power loads and a portion of the plurality of IT power loads.

Other aspects combinable with any of the previous aspects include operations described above with respect to the method for managing power loads of a data center.

Various implementations of systems and methods for controlling equipment that provide cooling for areas containing electronic equipment may include one or more of the following advantages. For example, the power distribution system may manage peak power consumption of the rack-mounted computers (e.g., information technology (IT) power loads) by throttling (e.g., reducing) electrical power loads associated with a data center infrastructure (e.g., cooling systems, lighting systems, building automation systems, and otherwise). For example, the power distribution system may reduce the amount of power distributed to the infrastructure power loads from a data center electrical station and/or redistribute power from the infrastructure power loads to the IT power loads. In some implementations, such allocation of power may allow the rack-mounted computers to operate without a substantial impact to (e.g., reduction in) performance level.

In some implementations, such management of power loads in the data center can allow for installation of additional rack-mounted computing devices in the data center based on monitored ambient conditions. For example, if the monitored ambient conditions indicate that the IT power load can consume an additional amount of power without exceeding the threshold power value, then additional rack-mounted computing devices may be installed in the data center, thereby increasing the productivity of the data center. As another example, such implementations may increase a speed of data center deployment by, for example, allowing the installation (or replacement) of computing devices (e.g., rack mounted servers or otherwise) during periods of cooler ambient conditions, even without removal of other (or older) devices first. As another example, such implementations may better adjust to global (or more specific geographic) climate change, as data centers that are located in colder climates that warm over time may not be as significantly impacted when cooling capacity needs to be added. As yet another example, such implementations may enable a seasonal increase in IT power capacity, thereby providing for automatic or semi-automatic (e.g., based on predicated or current ambient conditions) adjustment of infrastructure power loads to increase IT power capacity. For example, based on predicted (e.g., historical) or current ambient conditions, infrastructure power loads (e.g., cooling equipment loads) can be throttled thereby providing more available power capacity to rack-mounted computing devices.

As further examples, such implementations may provide for increased IT power capacity due to adjustment of infrastructure power loads in a load shifting environment. For instance, in some aspects, available IT power capacity may be increased in a time-shifting environment where, due to ambient conditions at night for example, infrastructure (e.g., cooling) power loads are lower, thereby allowing greater IT power capacity during those time periods of the day. As another example, cooling loads may be time-shifted as well, thereby increasing available IT power capacity during such load shifting. For instance, in cooling systems with a thermal storage tank or other thermal storage system (e.g., ice systems or otherwise), in which charging of the tank with cold liquid (e.g., water or glycol) occurs at night (e.g., through chiller operation) and discharging of the tank occurs (e.g., through pumping only without chiller use) by day, available IT power capacity may be increased during the day (e.g., when only pumps are operating) rather than at night (e.g., when chillers and pumps are operating). In such a scenario, thermal storage operation and IT load can also be balanced to provide benefits in that IT power capacity can be maximized along with a minimization of cooling load costs.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

A power distribution system of a data center operating at a specified power capacity may be used for managing power loads of the data center. Managing power loads of the data center may include electrically coupling a data center infrastructure power load and an information technology (IT) power load in the power distribution system and determining that a predicted amount of the IT power load is about equal to or greater than a threshold power value. Managing power loads of the data center may further include, based on such determination, throttling the infrastructure power load to reduce a portion of the power capacity used by the infrastructure power load, and based on such throttling, increasing another portion of the power capacity available to the IT power load.

Figure 1:
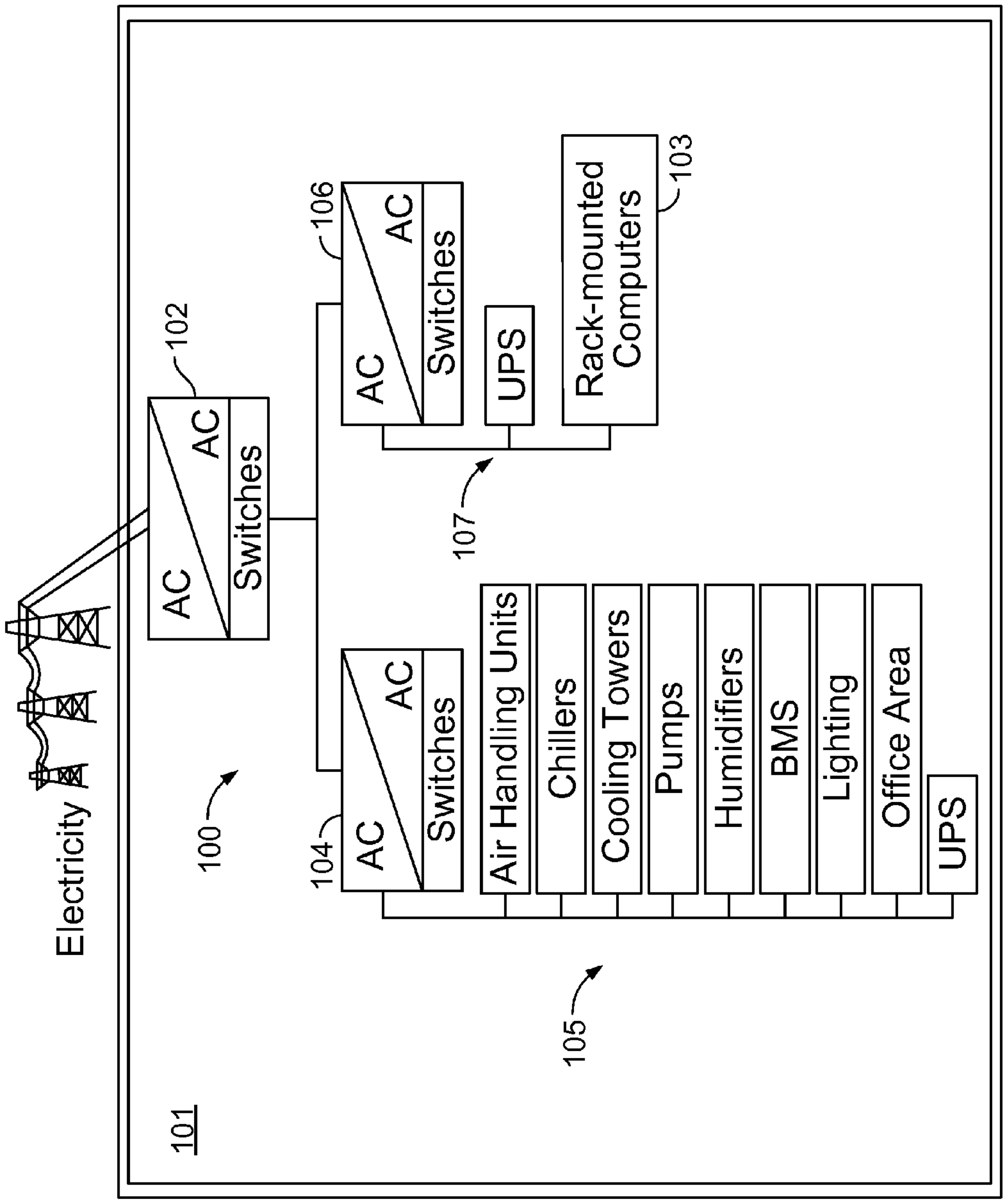
FIG. 1 illustrates an example power distribution system for powering an example computer data center.

FIG. 1 illustrates a schematic diagram showing a power distribution system 100 for powering a computer data center 101. The computer data center 101 is a building (e.g., modular, built-up, container-based, or otherwise) that houses multiple rack-mounted computers 103 and other power-consuming components (e.g., power loads that consume overhead energy) that support (e.g., directly or indirectly) operation of the rack-mounted computers 103. The computer data center 101 further includes a control system (not shown) that is communicably (e.g., electrically) coupled to the power distribution system 100, to the rack-mounted computers 103, and to the other power-consuming components of the data center.

As illustrated, the power-consuming components include data center infrastructure components 105 and IT components 107. Example infrastructure components 105 include components associated with a data center cooling system (e.g., air handling units, chillers, cooling towers, pumps, and humidifiers), components associated with a data center lighting system, and components associated with a data center building management system (e.g., office air conditioning (AC) and other equipment and uninterruptible power supplies). Example IT components 107 include components associated with the rack-mounted computers 103 (e.g., uninterruptible power supplies). In some implementations, one or more of the components associated with the data center cooling system (e.g., the chillers, cooling towers, fans, valves, condensing units, pumps, condensers, and otherwise) may represent the largest portion of the overhead energy consumed by the power-consuming components. In some examples, a smaller portion of the overhead energy may be consumed by one or more of the components associated with the data center lighting system and/or one or more of the components associated with the data center building management system.

In some implementations, power consumed by the various components of the computer data center 101 can vary over time. In some examples, power consumed by the infrastructure components 105 may vary considerably over time due to fluctuations in ambient temperatures external to the computer data center 101. For example, an unusually warm weather day may cause one or more of the infrastructure components 105 to consume an unusually high amount of power. In some examples, power consumed by the rack-mounted computers 103 and/or the IT components 107 may vary considerably over time due to workload variations. For example, an unusually high number of requests received by the computer data center 101 may cause one or more of the rack-mounted computers 103 and/or one or more of the IT components 107 to consume an unusually high amount of power.

In some implementations, the power distribution system 100 may monitor and control a distribution of power among the various components of the computer data center 101. As illustrated, the power distribution system 100 includes a data center electrical station 102 (e.g., a main electrical station), which draws a specified amount of power from one or more external electrical towers. The power distribution system 100 further includes a data center infrastructure substation 104 that provides power to the infrastructure components 105, and a data center IT substation 106 that provides power to the rack-mounted computers 103 and to the IT components 107. The data center electrical station 102, the infrastructure substation 104, and the IT substation 106 are all coupled to one another via multiple power busses (not shown) that are electrically coupled to one or more of the rack-mounted computers 103, to one or more of the infrastructure components 105, and/or to one or more of the IT components 107. The power busses may be located within any of the data center electrical station 102, the infrastructure substation 104, and the IT substation 106. Such coupling among the rack-mounted computers 103, the infrastructure components 105, and the IT components 107 provides that, at a particular time, the total power capacity of the computer data center 101 may be available to a subset of one or more of the components (e.g., any of the rack-mounted computers 103, the power components 105, or the IT components 107) of the computer data center 101.

The data center electrical station 102 includes an input device, transformers, and switches that can receive high voltage (e.g., 13.5 kV) electricity from one or more external electrical sources (e.g., towers) and distribute an appropriate (e.g., reduced) amount of power (e.g., electricity at 4160 VAC, 480 VAC, 120 VAC or even direct current (DC) power such as 110 VDC) to each of the infrastructure substation 104 and the IT substation 106. In some implementations, the infrastructure substation 104 includes transformers and switches that can receive an appropriate amount of power (e.g., electricity at 4160 VAC) from the data center electrical station 102 and distribute an appropriate (e.g., reduced) amount of power (e.g., electricity at 120-480 VAC) to the various infrastructure components 105 of the data center 101. The IT substation 106 includes transformers and switches that can receive an appropriate amount of power (e.g., electricity at 4160 VAC) from the data center electrical station 102 and distribute an appropriate (e.g., reduced) amount of power (e.g., electricity at 120-480 VAC) to the various IT components 107 of the data center 101.

In some implementations, the power distribution system 100 redistributes power among the infrastructure components 105 and IT components 107 in order to prevent one or more of the data center components from exceeding a threshold power consumption or to prevent a peak power consumption (e.g., a sum of the peak power consumption of the infrastructure components 105 and a peak power consumption of the IT components and/or the rack-mounted computers 103) from exceeding the specified power capacity of the computer data center 101. In this manner, a power spike may be prevented from tripping circuit breakers associated with the various components of the computer data center 101 or from cutting power to the rack-mounted computers 103. In some examples, the threshold power consumption is a maximum allowable power value (e.g., due to a physical limitation of one or more particular components or a contractual limit set with an electricity provider). In some examples, the threshold power consumption is a power value that is less than the maximum allowable power value but greater than a desired power level. For example, a design peak capacity (e.g., a sum of a peak power capacity of the infrastructure components 105 and a peak power capacity of the IT components 107) may be greater than a total power capacity of the power distribution system 100. Such a design can be permitted because in operation, a peak power capacity of all of the infrastructure components 105 and all of the IT components 107 may not be achieved. Furthermore, in cases where such a peak power capacity is predicted, the infrastructure substation 104 may be throttled in order to prevent such a situation from occurring.

In some implementations, the power distribution system 100 manages peak power consumption of the rack-mounted computers 103 and/or the IT components 107 by throttling the infrastructure substation 104 to adjust the amount of power consumed by the infrastructure components 105. For example, the power distribution system 100 may reduce the amount of power distributed to the infrastructure substation 104 from the data center electrical station 102 and/or redistribute power from the infrastructure substation 104 to the IT substation 106. In some implementations, such redistribution of power may allow the rack-mounted computers 103 to operate without a substantial impact to (e.g., reduction in) performance level. In some examples, such redistribution of power may last for an extended period of time (e.g., more than one second or up to 10 seconds).

In some implementations, the power distribution system 100 can be set to a static constant maximum allowed power, and this could be altered (e.g., manually or otherwise) when required or desired. For example, the data center electrical station 102 may be controlled to provide a predetermined (e.g., substantially constant) amount of power to the infrastructure substation 104 except during predetermined times during which the IT substation 106 is expected to consume peak levels of power. In such cases, the control system can throttle the infrastructure substation 104 during the predetermined times and increase the power distributed to the IT substation 106.

In some implementations, the power distribution system 100 can be dynamically controlled. For example, the control system may monitor incoming requests to the computer data center 101 and determine (e.g., predict) that one or more of the incoming requests will raise the peak power consumption above the threshold power consumption or above the specified power capacity of the computer data center 101. In such cases, the control system may begin to throttle the infrastructure substation 104 before the one or more incoming requests are received by the computer data center 101 (or, e.g., implemented by the rack-mounted computers 103) and accordingly increase the power distributed to the IT substation 106.

Figure 2:
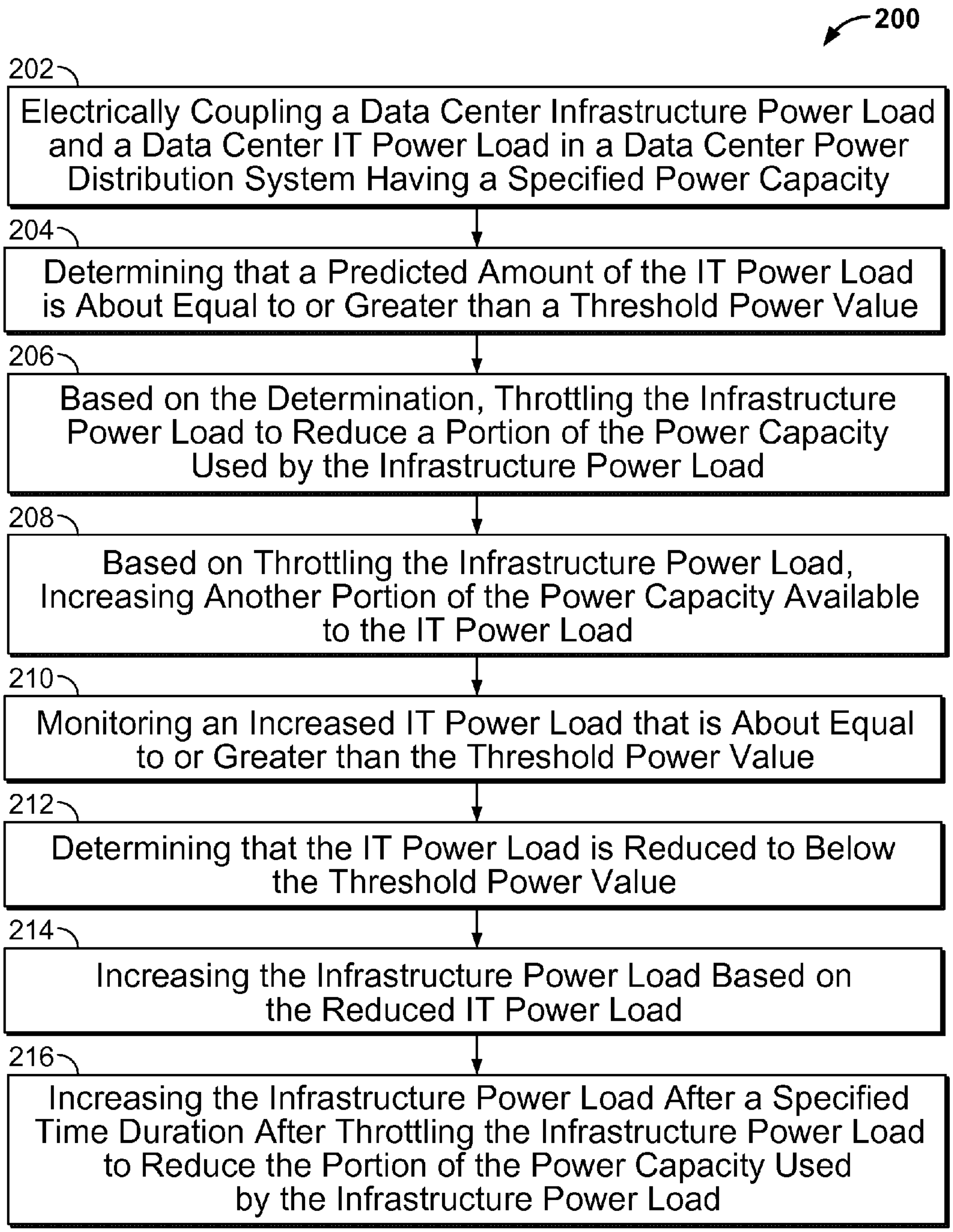
FIG. 2 illustrates an example process for managing power loads of a computer data center.

FIG. 2 illustrates an example process 200 for managing power in a computer data center. In some aspects, the process 200 can be implemented by, for example, the power distribution system 100 and the control system of the computer data center 101.

The process 200 may begin at step 202 with electrically coupling an infrastructure substation (e.g., the infrastructure substation 104) and an IT substation (e.g., the IT substation 106) in a power distribution system (e.g., the power distribution system 100) of a computer data center (e.g., the computer data center 101). Accordingly, an infrastructure power load (e.g., provided by multiple infrastructure power loads, such as the infrastructure components 105) associated with the infrastructure substation and an IT power load (e.g., provided by multiple IT power loads, such as the IT components 107) associated with the IT substation are electrically coupled to each other in the power distribution system. The data center may operate at a specified power capacity. In some implementations, the infrastructure substation and the IT substation may be coupled to one another via multiple power busses that are electrically coupled to one or more rack-mounted computers, to one or more of the infrastructure power loads, and/or to one or more of the IT power loads within the data center. In some examples, a sum of a peak of the infrastructure power load and a peak of the IT power load is greater than the specified power capacity.

In step 204, it is determined by, for example, a control system of the data center (e.g., the control system of the computer data center 101), that a predicted amount of the IT power load is about equal to or greater than a threshold power value. In some implementations, such determining includes collecting historical data associated with various loads of the IT power load and determining the threshold power value based on the collected historical data. The historical data can provide information regarding how much power is consumed by rack-mounted computers and associated IT power loads during implementation of particular requests received by the data center (e.g., search requests, email processing requests, and otherwise). In some examples, the threshold power value is a maximum allowable power value or a power value that is less than the maximum allowable power value but greater than a desired power level. In some implementations, such determining includes monitoring ambient conditions external to the data center and determining the threshold power value based on the monitored ambient conditions. In some examples, additional rack-mounted computing devices are installed in the data center based on the monitored ambient conditions. For example, if the monitored ambient conditions indicate that the IT power load can consume an additional amount of power without exceeding the threshold power value, then additional rack-mounted computing devices may be installed in the data center, thereby increasing a productivity of the data center.

In some implementations, determining that a predicted amount of the IT power load is about equal to or greater than the threshold power value includes monitoring multiple computing loads received at the data center for processing by the multiple rack-mounted computing devices, determining a required power usage to process the monitored computing loads, and prior to processing the monitored computing loads, determining that the IT power load that includes the required power usage, at least in part, exceeds the threshold power value.

In step 206, based on determining that a predicted amount of the IT power load is about equal to or greater than a threshold power value, the infrastructure power load is throttled by, for example, the control system of the data center to reduce a portion of the specified power capacity used by the infrastructure power load. In some implementations, such throttling includes determining an amount of power used by each of at least some of the infrastructure power loads, ranking the determined amounts of power from highest to lowest, and reducing a power consumption of one of the at least some of the multiple infrastructure power loads associated with the highest ranking. In some examples, the determined amounts of power may be ranked in a different manner (e.g., from lowest to highest) or may not be ranked at all. In some implementations, such reduction of the power consumption includes reducing a power consumption of a chiller with a variable frequency drive, reducing a power consumption of a chiller by current limiting, turning off a chiller, and/or reducing a power consumption of one or more lights of the data center.

In some examples, a power consumption of one or more additional infrastructure power loads may need to be reduced. For example, subsequent to reducing the power consumption of the at least some of the multiple infrastructure power loads associated with the highest ranking, a power draw of the infrastructure power load is monitored by the control system, and based on the monitored power draw being above a particular power draw, a power consumption of another of the at least some of the multiple infrastructure power loads associated with a next highest ranking is reduced. In some implementations, reducing the power consumption of the other infrastructure power load includes at least one of reducing a power consumption of a fan or a fan coil unit or reducing a power consumption of a pump.

Of course, in some implementations, an initial throttling of infrastructure power loads (e.g., at step 206) may not be of a chiller or chillers but may instead be of fans (e.g., at fan coil units or cooling towers), pumps, condensing units, condenser, or other loads besides chillers. For example, in a chiller-less system (e.g., a cooling system that, for instance, relies on evaporative cooling only), the initial throttling of infrastructure power loads may be of pumps and then fans (or fans and then pumps, or other combinations).

In some implementations, throttling the infrastructure power load to reduce a portion of the power capacity used by the infrastructure power load includes reducing the infrastructure power load by an amount substantially equal to or greater than an amount that the predicted amount of the IT power load exceeds the threshold power value. In some examples, the historical data includes power usage data of the multiple IT power loads that is grouped in multiple time segments including at least one of hours, days, weeks, or months.

In further aspects, such as extreme cases in which primary cooling equipment cannot be throttled (e.g., due to ambient conditions or a temperature of IT equipment being at or above a threshold value), the infrastructure loads may not be throttled based on the determination in step 204. For example, in some aspects, instead of (or in addition to) throttling infrastructure components, certain electrical equipment, such as transformers, may be operated at higher ratings/temperature to provide more electrical power to the IT loads. In some aspects, such operation of, for example, transformers may be monitored and/or limited due to, for instance, the extra wear and lifetime operating reduction due to operation beyond a maximum rating.

In step 208, based on throttling the infrastructure power load, another portion of the specified power capacity available to the IT power load is increased by, for example, the control system of the data center.

In step 210, after the other portion of the specified power capacity available to the IT power load is increased, an increased IT power load that is about equal to or greater than the threshold power value is monitored by the control system of the data center.

In step 212, it may be determined that the IT power load is reduced to below the threshold power value based on the monitoring.

In step 214, the infrastructure power load is accordingly increased based on the reduced IT power load by the control system of the data center.

In step 216, after a specified time duration after throttling the infrastructure power load to reduce the portion of the power capacity used by the infrastructure power load, the infrastructure power load may be alternatively or additionally increased by the control system of the data center.

Figure 3:
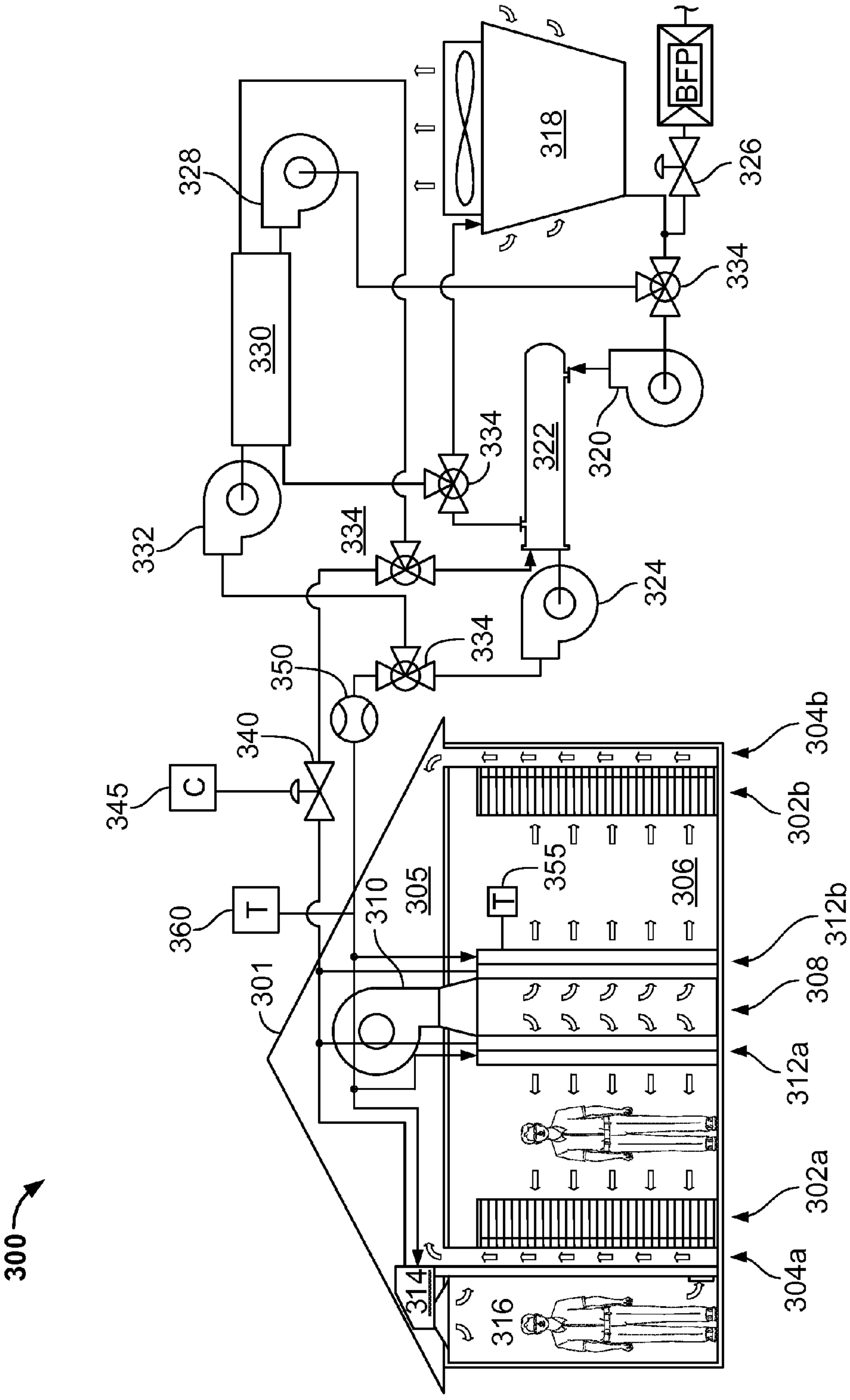
FIG. 3 illustrates a schematic diagram showing a system for cooling a computer data center.

FIG. 3 illustrates a schematic diagram showing a system 300 for cooling a computer data center 301, which as shown, is a building that houses a large number of computers or similar heat-generating electronic components. In some examples, the computer data center 301 is an implementation of the computer data center 101 and accordingly includes one or more of the components of the computer data center 101 in order to, for example, control a distribution of power throughout the computer data center 301. For example, the computer data center 201 can include a power distribution system (e.g., the power distribution system 100), a control system (e.g., the control system of the computer data center 101), one or more rack-mounted computers (e.g., the rack-mounted computers 103), one or more infrastructure components (e.g., the infrastructure components 105), and/or one or more IT components (e.g., the IT components 107).

In some implementations, the computer data center 301 includes infrastructure components such as a chiller 330, pumps 328, 332, a fan 310, and valves 340, which will be described in more detail below. Such infrastructure components may be throttled to reduce their power consumption. For example, the power consumption of the chiller 330 may be reduced via a variable frequency drive, current limiting, powering off the chiller 330, or raising a chilled temperature of water exiting the chiller 30. In some examples, the power consumption of the pumps 328, 332 or the fan 310 may be reduced via a variable frequency drive, a two-speed motor, or powering off.

In some implementations, the system 300 may implement static approach control and/or dynamic approach control to, for example, control an amount of cooling fluid circulated to cooling modules (such as cooling coils 312*a* and 312*b*). For example, a cooling apparatus may be controlled to maintain a static or dynamic approach temperature that is defined by a difference between a leaving air temperature of the cooling apparatus and an entering cooling fluid temperature of the cooling apparatus. A workspace 306 is defined around the computers, which are arranged in a number of parallel rows and mounted in vertical racks, such as racks 302*a*, 302*b*. The racks may include pairs of vertical rails to which are attached paired mounting brackets (not shown). Trays containing computers, such as standard circuit boards in the form of motherboards, may be placed on the mounting brackets.

In one example, the mounting brackets may be angled rails welded or otherwise adhered to vertical rails in the frame of a rack, and trays may include motherboards that are slid into place on top of the brackets, similar to the manner in which food trays are slid onto storage racks in a cafeteria, or bread trays are slid into bread racks. The trays may be spaced closely together to maximize the number of trays in a data center, but sufficiently far apart to contain all the components on the trays and to permit air circulation between the trays.

Other arrangements may also be used. For example, trays may be mounted vertically in groups, such as in the form of computer blades. The trays may simply rest in a rack and be electrically connected after they are slid into place, or they may be provided with mechanisms, such as electrical traces along one edge, that create electrical and data connections when they are slid into place.

Air may circulate from workspace 306 across the trays and into warm-air plenums 304*a*, 304*b* behind the trays. The air may be drawn into the trays by fans mounted at the back of the trays (not shown). The fans may be programmed or otherwise configured to maintain a set exhaust temperature for the air into the warm air plenum, and may also be programmed or otherwise configured to maintain a particular temperature rise across the trays. Where the temperature of the air in the work space 306 is known, controlling the exhaust temperature also indirectly controls the temperature rise. The work space 306 may, in certain circumstances, be referenced as a “cold aisle,” and the plenums 304*a*, 304*b* as “warm aisles.”

The temperature rise can be large. For example, the work space 306 temperature may be between about 74-79° F. (e.g., about 77° F. (25° C.)) and the exhaust temperature into the warm-air plenums 304*a*, 304*b* may be set between 110-120° F. (e.g., about 113° F. (45° C.)), for about a 36° F. (20° C.)) rise in temperature. The exhaust temperature may also be between 205-220° F., for example, as much as 212° F. (100° C.) where the heat generating equipment can operate at such elevated temperature. For example, the temperature of the air exiting the equipment and entering the warm-air plenum may be 118.4, 122, 129.2, 136.4, 143.6, 150.8, 158, 165, 172.4, 179.6, 186.8, 194, 201, or 208.4° F. (48, 50, 54, 58, 62, 66, 70, 74, 78, 82, 86, 90, 94, or 98° C.). Such a high exhaust temperature generally runs contrary to teachings that cooling of heat-generating electronic equipment is best conducted by washing the equipment with large amounts of fast-moving, cool air. Such a cool-air approach does cool the equipment, but it also uses lots of energy.

Cooling of particular electronic equipment, such as microprocessors, may be improved even where the flow of air across the trays is slow, by attaching impingement fans to the tops of the microprocessors or other particularly warm components, or by providing heat pipes and related heat exchangers for such components.

The heated air may be routed upward into a ceiling area, or attic 305, or into a raised floor or basement, or other appropriate space, and may be gathered there by air handling units that include, for example, fan 310, which may include, for example, one or more centrifugal fans appropriately sized for the task. The fan 310 may then deliver the air back into a plenum 308 located adjacent to the workspace 306. The plenum 308 may be simply a bay-sized area in the middle of a row of racks, that has been left empty of racks, and that has been isolated from any warm-air plenums on either side of it, and from cold-air work space 306 on its other sides. Alternatively, air may be cooled by coils defining a border of warm-air plenums 304*a*, 304*b* and expelled directly into workspace 306, such as at the tops of warm-air plenums 304*a*, 304*b*.

Cooling coils 312*a*, 312*b* may be located on opposed sides of the plenum approximately flush with the fronts of the racks. (The racks in the same row as the plenum 308, coming in and out of the page in the figure, are not shown.) The coils may have a large surface area and be very thin so as to present a low pressure drop to the system 300. In this way, slower, smaller, and quieter fans may be used to drive air through the system. Protective structures such as louvers or wire mesh may be placed in front of the coils 312*a*, 312*b* to prevent them from being damaged.

In operation, fan 310 pushes air down into plenum 308, causing increased pressure in plenum 308 to push air out through cooling coils 312*a*, 312*b*. As the air passes through the coils 312*a*, 312*b*, its heat is transferred into the water in the coils 312*a*, 312*b*, and the air is cooled.

The speed of the fan 310 and/or the flow rate or temperature of cooling water flowing in the cooling coils 312*a*, 312*b* may be controlled in response to measured values. For example, the pumps driving the cooling liquid may be variable speed pumps that are controlled to maintain a particular temperature in work space 306. Such control mechanisms may be used to maintain a constant temperature in workspace 306 or plenums 304*a*, 304*b* and attic 305.

The workspace 306 air may then be drawn into racks 302*a*, 302*b* such as by fans mounted on the many trays that are mounted in racks 302*a*, 302*b*. This air may be heated as it passes over the trays and through power supplies running the computers on the trays, and may then enter the warm-air plenums 304*a*, 304*b*. Each tray may have its own power supply and fan, with the power supply at the back edge of the tray, and the fan attached to the back of the power supply. All of the fans may be configured or programmed to deliver air at a single common temperature, such as at a set 113° F. (45° C.). The process may then be continuously readjusted as fan 310 captures and circulates the warm air.

Additional items may also be cooled using system 300. For example, room 316 is provided with a self-contained fan coil unit 314 which contains a fan and a cooling coil. The unit 314 may operate, for example, in response to a thermostat provided in room 316. Room 316 may be, for example, an office or other workspace ancillary to the main portions of the data center 301.

In addition, supplemental cooling may also be provided to room 316 if necessary. For example, a standard roof-top or similar air-conditioning unit (not shown) may be installed to provide particular cooling needs on a spot basis. As one example, system 300 may be designed to deliver 78° F. (25.56° C.) supply air to work space 306, and workers may prefer to have an office in room 316 that is cooler. Thus, a dedicated air-conditioning unit may be provided for the office. This unit may be operated relatively efficiently, however, where its coverage is limited to a relatively small area of a building or a relatively small part of the heat load from a building. Also, cooling units, such as chillers, may provide for supplemental cooling, though their size may be reduced substantially compared to if they were used to provide substantial cooling for the system 300.

Fresh air may be provided to the workspace 306 by various mechanisms. For example, a supplemental air-conditioning unit (not shown), such as a standard roof-top unit may be provided to supply necessary exchanges of outside air. Also, such a unit may serve to dehumidify the workspace 306 for the limited latent loads in the system 300, such as human perspiration. Alternatively, louvers may be provided from the outside environment to the system 300, such as powered louvers to connect to the warm air plenum 304*b*. System 300 may be controlled to draw air through the plenums when environmental (outside) ambient humidity and temperature are sufficiently low to permit cooling with outside air. Such louvers may also be ducted to fan 310, and warm air in plenums 304*a*, 304*b* may simply be exhausted to atmosphere, so that the outside air does not mix with, and get diluted by, the warm air from the computers. Appropriate filtration may also be provided in the system, particularly where outside air is used.

Also, the workspace 306 may include heat loads other than the trays, such as from people in the space and lighting. Where the volume of air passing through the various racks is very high and picks up a very large thermal load from multiple computers, the small additional load from other sources may be negligible, apart from perhaps a small latent heat load caused by workers, which may be removed by a smaller auxiliary air conditioning unit as described above.

Cooling water may be provided from a cooling water circuit powered by pump 324. The cooling water circuit may be formed as a direct-return, or indirect-return, circuit, and may generally be a closed-loop system. Pump 324 may take any appropriate form, such as a standard centrifugal pump. Heat exchanger 322 may remove heat from the cooling water in the circuit. Heat exchanger 322 may take any appropriate form, such as a plate-and-frame heat exchanger or a shell-and-tube heat exchanger.

Heat may be passed from the cooling water circuit to a condenser water circuit that includes heat exchanger 322, pump 320, and cooling tower 318. Pump 320 may also take any appropriate form, such as a centrifugal pump. Cooling tower 318 may be, for example, one or more forced draft towers or induced draft towers. The cooling tower 318 may be considered a free cooling source, because it requires power only for movement of the water in the system and in some implementations the powering of a fan to cause evaporation; it does not require operation of a compressor in a chiller or similar structure.

The cooling tower 318 may take a variety of forms, including as a hybrid cooling tower. Such a tower may combine both the evaporative cooling structures of a cooling tower with a water-to-water heat exchanger. As a result, such a tower may be fit in a smaller face and be operated more modularly than a standard cooling tower with separate heat exchanger. Additional advantage may be that hybrid towers may be run dry, as discussed above. In addition, hybrid towers may also better avoid the creation of water plumes that may be viewed negatively by neighbors of a facility.

As shown, the fluid circuits may create an indirect water-side economizer arrangement. This arrangement may be relatively energy efficient, in that the only energy needed to power it is the energy for operating several pumps and fans. In addition, this system may be relatively inexpensive to implement, because pumps, fans, cooling towers, and heat exchangers are relatively technologically simple structures that are widely available in many forms. In addition, because the structures are relatively simple, repairs and maintenance may be less expensive and easier to complete. Such repairs may be possible without the need for technicians with highly specialized knowledge.

Alternatively, direct free cooling may be employed, such as by eliminating heat exchanger 322, and routing cooling tower water (condenser water) directly to cooling coils 312*a*, 312*b* (not shown). Such an implementation may be more efficient, as it removes one heat exchanging step. However, such an implementation also causes water from the cooling tower 318 to be introduced into what would otherwise be a closed system. As a result, the system in such an implementation may be filled with water that may contain bacteria, algae, and atmospheric contaminants, and may also be filled with other contaminants in the water. A hybrid tower, as discussed above, may provide similar benefits without the same detriments.

Control valve 326 is provided in the condenser water circuit to supply make-up water to the circuit. Make-up water may generally be needed because cooling tower 318 operates by evaporating large amounts of water from the circuit. The control valve 326 may be tied to a water level sensor in cooling tower 318, or to a basin shared by multiple cooling towers. When the water falls below a predetermined level, control valve 326 may be caused to open and supply additional makeup water to the circuit. A back-flow preventer (BFP) may also be provided in the make-up water line to prevent flow of water back from cooling tower 318 to a main water system, which may cause contamination of such a water system.

Optionally, a separate chiller circuit may be provided. Operation of system 300 may switch partially or entirely to this circuit during times of extreme atmospheric ambient (i.e., hot and humid) conditions or times of high heat load in the data center 301. Controlled mixing valves 334 are provided for electronically switching to the chiller circuit, or for blending cooling from the chiller circuit with cooling from the condenser circuit. Pump 328 may supply tower water to chiller 330, and pump 332 may supply chilled water, or cooling water, from chiller 330 to the remainder of system 300. Chiller 330 may take any appropriate form, such as a centrifugal, reciprocating, or screw chiller, or an absorption chiller.

The chiller circuit may be controlled to provide various appropriate temperatures for cooling water. In some implementations, the chilled water may be supplied exclusively to a cooling coil, while in others, the chilled water may be mixed, or blended, with water from heat exchanger 322, with common return water from a cooling coil to both structures. The chilled water may be supplied from chiller 330 at temperatures elevated from typical chilled water temperatures. For example, the chilled water may be supplied at temperatures of 55° F. (13° C.) to 65 to 70° F. (18 to 21° C.) or higher. The water may then be returned at temperatures like those discussed below, such as 59 to 176° F. (15 to 80° C.). In this approach that uses sources in addition to, or as an alternative to, free cooling, increases in the supply temperature of the chilled water can also result in substantial efficiency improvements for the system 300.

Pumps 320, 324, 328, 332, may be provided with variable speed drives. Such drives may be electronically controlled by a central control system to change the amount of water pumped by each pump in response to changing set points or changing conditions in the system 300. For example, pump 324 may be controlled to maintain a particular temperature in workspace 306, such as in response to signals from a thermostat or other sensor in workspace 306.

In operation, system 300 may respond to signals from various sensors placed in the system 300. The sensors may include, for example, thermostats, humidistats, flowmeters, and other similar sensors. In one implementation, one or more thermostats may be provided in warm air plenums 304*a*, 304*b*, and one or more thermostats may be placed in workspace 306. In addition, air pressure sensors may be located in workspace 306, and in warm air plenums 304*a*, 304*b*. The thermostats may be used to control the speed of associated pumps, so that if temperature begins to rise, the pumps turn faster to provide additional cooling waters. Thermostats may also be used to control the speed of various items such as fan 310 to maintain a set pressure differential between two spaces, such as attic 305 and workspace 306, and to thereby maintain a consistent airflow rate. Where mechanisms for increasing cooling, such as speeding the operation of pumps, are no longer capable of keeping up with increasing loads, a control system may activate chiller 330 and associated pumps 328, 332, and may modulate control valves 334 accordingly to provide additional cooling.

Various values for temperature of the fluids in system 300 may be used in the operation of system 300. In one exemplary implementation, the temperature set point in warm air plenums 304*a*, 304*b* may be selected to be at or near a maximum exit temperature for trays in racks 302*a*, 302*b*. This maximum temperature may be selected, for example, to be a known failure temperature or a maximum specified operating temperature for components in the trays, or may be a specified amount below such a known failure or specified operating temperature. In certain implementations, a temperature of 45° C. may be selected. In other implementations, temperatures of 25° C. to 125° C. may be selected. Higher temperatures may be particularly appropriate where alternative materials are used in the components of the computers in the data center, such as high temperature gate oxides and the like.

In one implementation, supply temperatures for cooling water may be 68° F. (20° C.), while return temperatures may be 104° F. (40° C.). In other implementations, temperatures of 50° F. to 84.20° F. or 104° F. (10° C. to 29° C. or 40° C.) may be selected for supply water, and 59° F. to 176° F. (15° C. to 80° C.) for return water. Chilled water temperatures may be produced at much lower levels according to the specifications for the particular selected chiller. Cooling tower water supply temperatures may be generally slightly above the wet bulb temperature under ambient atmospheric conditions, while cooling tower return water temperatures will depend on the operation of the system 300.

Using these parameters and the parameters discussed above for entering and exiting air, relatively narrow approach temperatures may be achieved with the system 300. The approach temperature, in this example, is the difference in temperature between the air leaving a coil and the water entering a coil. The approach temperature will always be positive because the water entering the coil is the coldest water, and will start warming up as it travels through the coil. As a result, the water may be appreciably warmer by the time it exits the coil, and as a result, air passing through the coil near the water's exit point will be warmer than air passing through the coil at the water's entrance point. Because even the most-cooled exiting air, at the cooling water's entrance point, will be warmer than the entering water, the overall exiting air temperature will need to be at least somewhat warmer than the entering cooling water temperature.

In certain implementations, the entering water temperature may be between about 62-67° F. (e.g., about 64° F. (18° C.)) and the exiting air temperature between about 74-79° F. (e.g., about 77° F. (25° C.)), as noted above, for an approach temperature of between about 7-17° F. (e.g., about 12.6° F. (7° C.)). In other implementations, wider or narrower approach temperature may be selected based on economic considerations for an overall facility.

With a close approach temperature, the temperature of the cooled air exiting the coil will closely track the temperature of the cooling water entering the coil. As a result, the air temperature can be maintained, generally regardless of load, by maintaining a constant water temperature. In an evaporative cooling mode, a constant water temperature may be maintained as the wet bulb temperature stays constant (or changes very slowly), and by blending warmer return water with supply water as the wet bulb temperature falls. As such, active control of the cooling air temperature can be avoided in certain situations, and control may occur simply on the cooling water return and supply temperatures. The air temperature may also be used as a check on the water temperature, where the water temperature is the relevant control parameter.

As illustrated, the system 300 also includes a control valve 340 and a controller 345 operable to modulate the valve 340 in response to or to maintain, for example, an approach temperature set point of the cooling coils 312*a* and 312*b*. For example, an airflow temperature sensor 355 may be positioned at a leaving face of one or both of the cooling coils 312*a* and 312*b*. The temperature sensor 355 may thus measure a leaving air temperature from the cooling coils 312*a* and/or 312*b*. A temperature sensor 360 may also be positioned in a fluid conduit that circulates the cooling water to the cooling coils 312*a* and 312*b* (as well as fan coil 314).

Controller 345, as illustrated, may receive temperature information from one or both of the temperature sensors 355 and 360. In some implementations, the controller 345 may be a main controller (i.e., processor-based electronic device or other electronic controller) of the cooling system of the data center, which is communicably coupled to each control valve (such as control valve 340) of the data center and/or individual controllers associated with the control valves. For example, the main controller may be a master controller communicably coupled to slave controllers at the respective control valves. In some implementations, the controller 345 may be a Proportional-Integral-Derivative (PID) controller. Alternatively, other control schemes, such as PI or otherwise, may be utilized. As another example, the control scheme may be implemented by a controller utilizing a state space scheme (e.g., a time-domain control scheme) representing a mathematical model of a physical system as a set of input, output and state variables related by first-order differential equations. In some example implementations, the controller 345 (or other controllers described herein) may be a programmable logic controller (PLC), a computing device (e.g., desktop, laptop, tablet, mobile computing device, server or otherwise), or other form of controller. In cases in which a controller may control a fan motor, for instance, the controller may be a circuit breaker or fused disconnect (e.g., for on/off control), a two-speed fan controller or rheostat, or a variable frequency drive.

In operation, the controller 345 may receive the temperature information and determine an actual approach temperature. The controller 345 may then compare the actual approach temperature set point against a predetermined approach temperature set point. Based on a variance between the actual approach temperature and the approach temperature set point, the controller 345 may modulate the control valve 340 (and/or other control valves fluidly coupled to cooling modules such as the cooling coils 312*a* and 312*b* and fan coil 314) to restrict or allow cooling water flow. For instance, in the illustrated implementation, modulation of the control valve 340 may restrict or allow flow of the cooling water from or to the cooling coils 312*a* and 312*b* as well as the fan coil 314. After modulation, if required, the controller 345 may receive additional temperature information and further modulate the control valve 340 (e.g., implement a feedback loop control).

Figure 4:
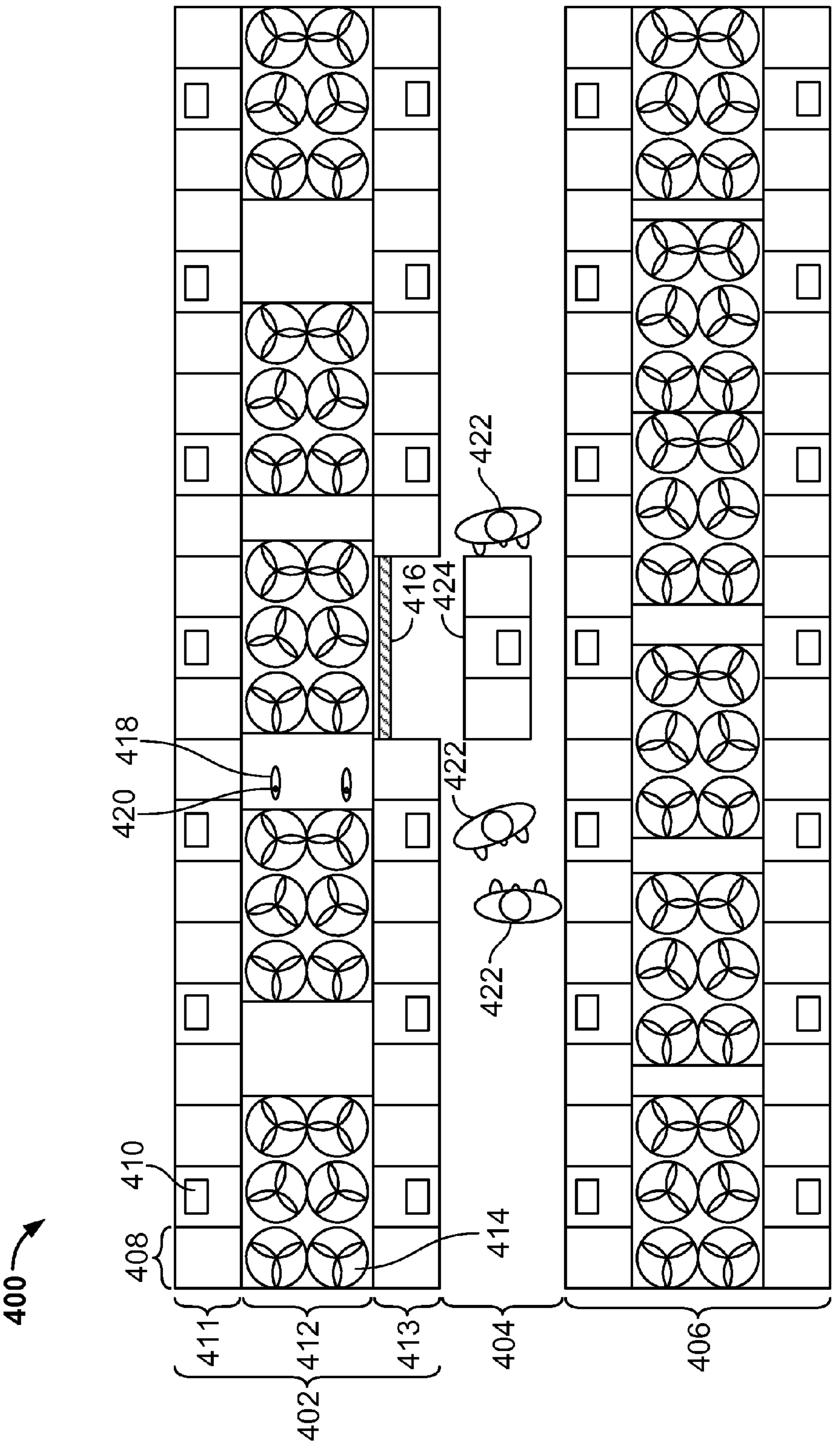
FIG. 4 shows a plan view of two rows in a computer data center with cooling modules arranged between racks situated in the rows.

FIG. 4 shows a plan view of two rows 402 and 406, respectively, in a computer data center 400 with cooling modules arranged between racks situated in the rows. In some examples, the computer data center 400 is an implementation of the computer data center 101 and accordingly includes one or more of the components of the computer data center 101 in order to, for example, control a distribution of power throughout the computer data center 400. For example, the computer data center 400 can include a power distribution system (e.g., the power distribution system 100), a control system (e.g., the control system of the computer data center 101), one or more rack-mounted computers (e.g., the rack-mounted computers 103), one or more infrastructure components (e.g., the infrastructure components 105), and/or one or more IT components (e.g., the IT components 107).

In some implementations, the computer data center 400 includes infrastructure components such as modules 412 (e.g., via fan coils with fans that can be throttled), which will be described in more detail below. In some examples, the computer data center 400 includes IT components such as racks 408 that may include mounted fans (e.g., mounted on motherboards or the backs of the racks 408) that are a part of the infrastructure load. In some implementations, such mounted fans may not be candidates for throttling, since such fans may provide a last line of defense for cooling.

In some implementations, the data center 400 may implement static approach control and/or dynamic approach control to, for example, control an amount of cooling fluid circulated to cooling modules. In general, this figure illustrates certain levels of density and flexibility that may be achieved with structures like those discussed above. Each of the rows 402, 406 is made up of a row of cooling modules 412 sandwiched by two rows of computing racks 411, 413. In some implementations (not shown), a row may also be provided with a single row of computer racks, such as by pushing the cooling modules up against a wall of a data center, providing blanking panels all across one side of a cooling module row, or by providing cooling modules that only have openings on one side.

This figure also shows a component—network device 410—that was not shown in prior figures. Network device 410 may be, for example, a network switch into which each of the trays in a rack plugs, and which then in turn communicates with a central network system. For example, the network device may have 20 or data more ports operating at 100 Mbps or 1000 Mbps, and may have an uplink port operating at 1000 Mbps or 10 Gbps, or another appropriate network speed. The network device 410 may be mounted, for example, on top of the rack, and may slide into place under the outwardly extending portions of a fan tray. Other ancillary equipment for supporting the computer racks may also be provided in the same or a similar location, or may be provided on one of the trays in the rack itself.

Each of the rows of computer racks and rows of cooling units in each of rows 402, 406 may have a certain unit density. In particular, a certain number of such computing or cooling units may repeat over a certain length of a row such as over 100 feet. Or, expressed in another way, each of the units may repeat once every X feet in a row.

In this example, each of the rows is approximately 40 feet long. Each of the three-bay racks is approximately six feet long. And each of the cooling units is slightly longer than each of the racks. Thus, for example, if each rack were exactly six feet long and all of the racks were adjoining, the rack units would repeat every six feet. As a result, the racks could be said to have a six-foot "pitch."

As can be seen, the pitch for the cooling module rows is different in row 402 than in row 406. Row 412 in row 402 contains five cooling modules, while the corresponding row of cooling modules in row 406 contains six cooling modules. Thus, if one assumes that the total length of each row is 42 feet, then the pitch of cooling modules in row 406 would be 7 feet (42/6) and the pitch of cooling modules in row 402 would be 8.4 feet (42/5).

The pitch of the cooling modules and of the computer racks may differ (and the respective lengths of the two kinds of apparatuses may differ) because warm air is able to flow up and down rows such as row 412. Thus, for example, a bay or rack may exhaust warm air in an area in which there is no cooling module to receive it. But that warm air may be drawn laterally down the row and into an adjacent module, where it is cooled and circulated back into the work space, such as aisle 404.

With all other things being equal, row 402 would receive less cooling than would row 406. However, it is possible that row 402 needs less cooling, so that the particular number of cooling modules in each row has been calculated to match the expected cooling requirements. For example, row 402 may be outfitted with trays holding new, low-power microprocessors; row 402 may contain more storage trays (which are generally lower power than processor trays) and fewer processor trays; or row 402 may generally be assigned less computationally intensive work than is row 406.

In addition, the two rows 402, 406 may both have had an equal number of cooling modules at one time, but then an operator of the data center may have determined that row 402 did not need as many modules to operate effectively. As a result, the operator may have removed one of the modules so that it could be used elsewhere.

The particular density of cooling modules that is required may be computed by first computing the heat output of computer racks on both sides of an entire row. The amount of cooling provided by one cooling module may be known, and may be divided into the total computed heat load and rounded up to get the number of required cooling units. Those units may then be spaced along a row so as to be as equally spaced as practical, or to match the location of the heat load as closely as practical, such as where certain computer racks in the row generate more heat than do others. Also, as explained in more detail below, the row of cooling units may be aligned with rows of support columns in a facility, and the units may be spaced along the row so as to avoid hitting any columns.

Where there is space between cooling modules, a blanking panel 420 may be used to block the space so that air from the warm air capture plenum does not escape upward into the work space. The panel 420 may simply take the form of a paired set of sheet metal sheets that slide relative to each other along slots 418 in one of the sheets, and can be fixed in location by tightening a connector onto the slots.

FIG. 4 also shows a rack 424 being removed for maintenance or replacement. The rack 424 may be mounted on caster wheels so that one of technicians 422 could pull it forward into aisle 404 and then roll it away. In the figure, a blanking panel 416 has been placed over an opening left by the removal of rack 424 to prevent air from the work space from being pulled into the warm air capture plenum, or to prevent warm air from the plenum from mixing into the work space. The blanking panel 416 may be a solid panel, a flexible sheet, or may take any other appropriate form.

In one implementation, a space may be laid out with cooling units mounted side-to-side for maximum density, but half of the units may be omitted upon installation (e.g., so that there is 50% coverage). Such an arrangement may adequately match the cooling unit capacity (e.g., about four racks per unit, where the racks are approximately the same length as the cooling units and mounted back-to-back on the cooling units) to the heat load of the racks. Where higher powered racks are used, the cooling units may be moved closer to each other to adapt for the higher heat load (e.g., if rack spacing is limited by maximum cable lengths), or the racks may be spaced from each other sufficiently so that the cooling units do not need to be moved. In this way, flexibility may be achieved by altering the rack pitch or by altering the cooling unit pitch.

Figure 5A:
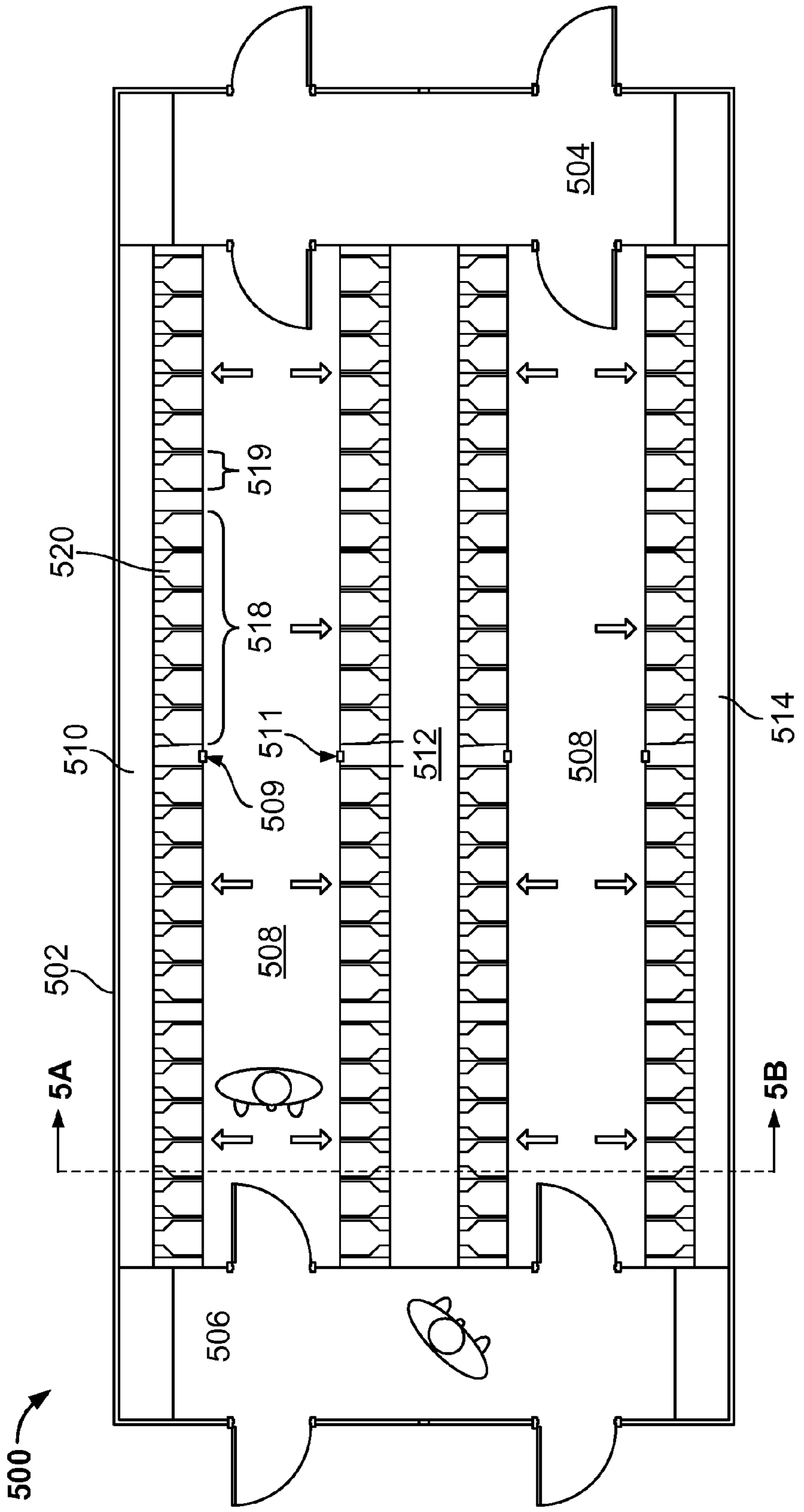
FIGS. 5A-5B show plan and sectional views, respectively, of a modular data center system.
Figure 5B:
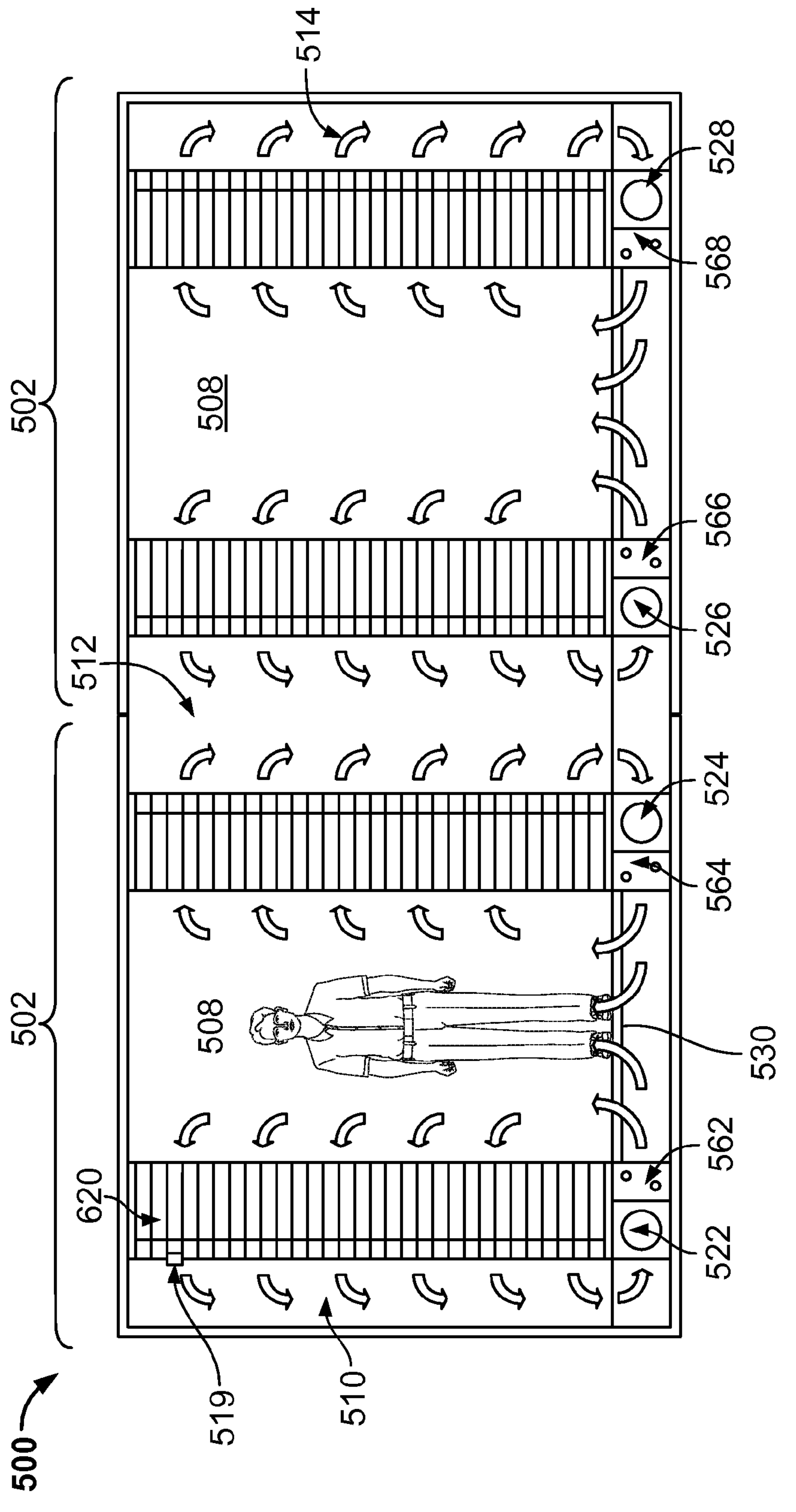

FIGS. 5A-5B show plan and sectional views, respectively, of a modular data center system. In some implementations, one or more data processing centers 500 may implement static approach control and/or dynamic approach control to, for example, control an amount of cooling fluid circulated to cooling modules. In some examples, a data processing center 500 is an implementation of the computer data center 101 and accordingly includes one or more of the components of the computer data center 101 in order to, for example, control a distribution of power throughout the data processing center 500. For example, the data processing center 500 can include a power distribution system (e.g., the power distribution system 100), a control system (e.g., the control system of the computer data center 101), one or more rack-mounted computers (e.g., the rack-mounted computers 103), one or more infrastructure components (e.g., the infrastructure components 105), and/or one or more IT components (e.g., the IT components 107).

In some implementations, the data processing centers 500 include infrastructure components such as fans 524, which will be described in more detail below. Such fans may be throttled to reduce their power consumption. For example, the power consumption of the fans 524 may be reduced via a variable frequency drive, a two-speed motor, or powering off.

The modular data center system may include one of more data processing centers 500 in shipping containers 502. Although not shown to scale in the figure, each shipping container 502 may be approximately 40 feet along, 8 feet wide, and 9.5 feet tall (e.g., a 1AAA shipping container). In other implementations, the shipping container can have different dimensions (e.g., the shipping container can be a 1CC shipping container). Such containers may be employed as part of a rapid deployment data center.

Each container 502 includes side panels that are designed to be removed. Each container 502 also includes equipment designed to enable the container to be fully connected with an adjacent container. Such connections enable common access to the equipment in multiple attached containers, a common environment, and an enclosed environmental space.

Each container 502 may include vestibules 504, 506 at each end of the relevant container 502. When multiple containers are connected to each other, these vestibules provide access across the containers. One or more patch panels or other networking components to permit for the operation of data processing center 500 may also be located in vestibules 504, 506. In addition, vestibules 504, 506 may contain connections and controls for the shipping container. For example, cooling pipes (e.g., from heat exchangers that provide cooling water that has been cooled by water supplied from a source of cooling such as a cooling tower) may pass through the end walls of a container, and may be provided with shut-off valves in the vestibules 504, 506 to permit for simplified connection of the data center to, for example, cooling water piping. Also, switching equipment may be located in the vestibules 504, 506 to control equipment in the container 502. The vestibules 504, 506 may also include connections and controls for attaching multiple containers 502 together. As one example, the connections may enable a single external cooling water connection, while the internal cooling lines are attached together via connections accessible in vestibules 504, 506. Other utilities may be linkable in the same manner.

Central workspaces 508 may be defined down the middle of shipping containers 502 as aisles in which engineers, technicians, and other workers may move when maintaining and monitoring the data processing center 500. For example, workspaces 508 may provide room in which workers may remove trays from racks and replace them with new trays. In general, each workspace 508 is sized to permit for free movement by workers and to permit manipulation of the various components in data processing center 500, including providing space to slide trays out of their racks comfortably. When multiple containers 502 are joined, the workspaces 508 may generally be accessed from vestibules 504, 506.

A number of racks such as rack 519 may be arrayed on each side of a workspace 508. Each rack may hold several dozen trays, like tray 520, on which are mounted various computer components. The trays may simply be held into position on ledges in each rack, and may be stacked one over the other. Individual trays may be removed from a rack, or an entire rack may be moved into a workspace 508.

The racks may be arranged into a number of bays such as bay 518. In the figure, each bay includes six racks and may be approximately 8 feet wide. The container 502 includes four bays on each side of each workspace 508. Space may be provided between adjacent bays to provide access between the bays, and to provide space for mounting controls or other components associated with each bay. Various other arrangements for racks and bays may also be employed as appropriate.

Warm air plenums 510, 514 are located behind the racks and along the exterior walls of the shipping container 502. A larger joint warm air plenum 512 is formed where the two shipping containers are connected. The warm air plenums receive air that has been pulled over trays, such as tray 520, from workspace 508. The air movement may be created by fans located on the racks, in the floor, or in other locations. For example, if fans are located on the trays and each of the fans on the associated trays is controlled to exhaust air at one temperature, such as 40° C., 42.5° C., 45° C., 47.5° C., 50° C., 52.5° C., 55° C., or 57.5° C., the air in plenums 510, 512, 514 will generally be a single temperature or almost a single temperature. As a result, there may be little need for blending or mixing of air in warm air plenums 510, 512, 514. Alternatively, if fans in the floor are used, there will be a greater degree temperature variation from air flowing over the racks, and greater degree of mingling of air in the plenums 510, 512, 514 to help maintain a consistent temperature profile.

FIG. 5B shows a sectional view of the data center from FIG. 5A. This figure more clearly shows the relationship and airflow between workspaces 508 and warm air plenums 510, 512, 514. In particular, air is drawn across trays, such as tray 520, by fans at the back of the trays 519. Although individual fans associated with single trays or a small number of trays, other arrangements of fans may also be provided. For example, larger fans or blowers, may be provided to serve more than one tray, to serve a rack or group or racks, or may be installed in the floor, in the plenum space, or other location.

Air may be drawn out of warm air plenums 510, 512, 514 by fans 522, 524, 526, 528. Fans 522, 524, 526, 528 may take various forms. In one exemplary implementation, the may be in the form of a number of squirrel cage fans. The fans may be located along the length of container 502, and below the racks, as shown in FIG. 5B. A number of fans may be associated with each fan motor, so that groups of fans may be swapped out if there is a failure of a motor or fan.

An elevated floor 530 may be provided at or near the bottom of the racks, on which workers in workspaces 508 may stand. The elevated floor 530 may be formed of a perforated material, of a grating, or of mesh material that permits air from fans 522, 524 to flow into workspaces 508. Various forms of industrial flooring and platform materials may be used to produce a suitable floor that has low pressure losses.

Fans 522, 524, 526, 528 may blow heated air from warm air plenums 510, 512, 514 through cooling coils 562, 564, 566, 568. The cooling coils may be sized using well known techniques, and may be standard coils in the form of air-to-water heat exchangers providing a low air pressure drop, such as a 0.5 inch pressure drop. Cooling water may be provided to the cooling coils at a temperature, for example, of 10, 15, or 20 degrees Celsius, and may be returned from cooling coils at a temperature of 20, 25, 30, 35, or 40 degrees Celsius. In other implementations, cooling water may be supplied at 15, 10, or 20 degrees Celsius, and may be returned at temperatures of about 25 degrees Celsius, 30 degrees Celsius, 35 degrees Celsius, 45 degrees Celsius, 50 degrees Celsius, or higher temperatures. The position of the fans 522, 524, 526, 528 and the coils 562, 564, 566, 568 may also be reversed, so as to give easier access to the fans for maintenance and replacement. In such an arrangement, the fans will draw air through the cooling coils.

The particular supply and return temperatures may be selected as a parameter or boundary condition for the system, or may be a variable that depends on other parameters of the system. Likewise, the supply or return temperature may be monitored and used as a control input for the system, or may be left to range freely as a dependent variable of other parameters in the system. For example, the temperature in workspaces 508 may be set, as may the temperature of air entering plenums 510, 512, 514. The flow rate of cooling water and/or the temperature of the cooling water may then vary based on the amount of cooling needed to maintain those set temperatures.

The particular positioning of components in shipping container 502 may be altered to meet particular needs. For example, the location of fans and cooling coils may be changed to provide for fewer changes in the direction of airflow or to grant easier access for maintenance, such as to clean or replace coils or fan motors. Appropriate techniques may also be used to lessen the noise created in workspace 508 by fans. For example, placing coils in front of the fans may help to deaden noise created by the fans. Also, selection of materials and the layout of components may be made to lessen pressure drop so as to permit for quieter operation of fans, including by permitting lower rotational speeds of the fans. The equipment may also be positioned to enable easy access to connect one container to another, and also to disconnect them later. Utilities and other services may also be positioned to enable easy access and connections between containers 502.

Airflow in warm air plenums 510, 512, 514 may be controlled via pressure sensors. For example, the fans may be controlled so that the pressure in warm air plenums is roughly equal to the pressure in workspaces 508. Taps for the pressure sensors may be placed in any appropriate location for approximating a pressure differential across the trays 520. For example, one tap may be placed in a central portion of plenum 512, while another may be placed on the workspace 508 side of a wall separating plenum 512 from workspace 508. For example the sensors may be operated in a conventional manner with a control system to control the operation of fans 522, 524, 526, 528. One sensor may be provided in each plenum, and the fans for a plenum or a portion of a plenum may be ganged on a single control point.

For operations, the system may better isolate problems in one area from other components. For instance, if a particular rack has trays that are outputting very warm air, such action will not affect a pressure sensor in the plenum (even if the fans on the rack are running at high speed) because pressure differences quickly dissipate, and the air will be drawn out of the plenum with other cooler air. The air of varying temperature will ultimately be mixed adequately in the plenum, in a workspace, or in an area between the plenum and the workspace.

Figure 6A:
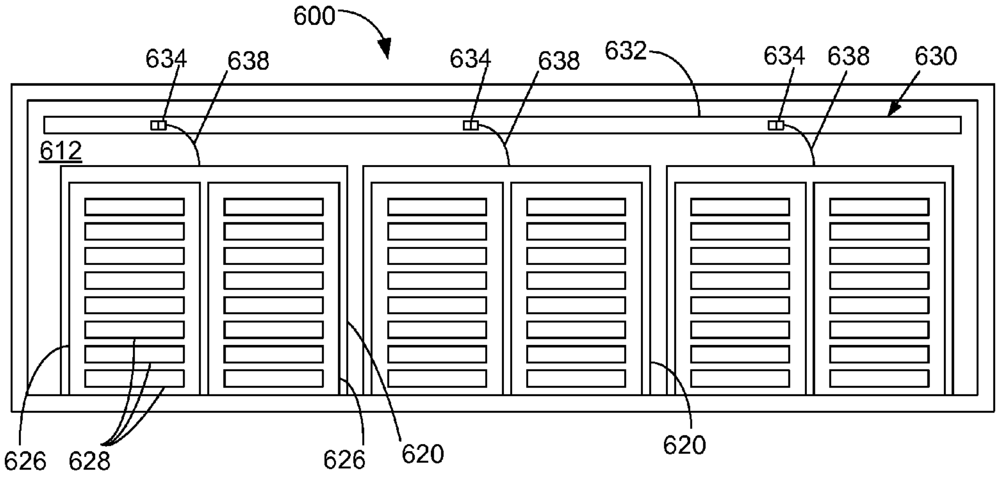
FIGS. 6A and 6B show side and plan views, respectively, of an example facility operating as a computer data center.
Figure 6B:
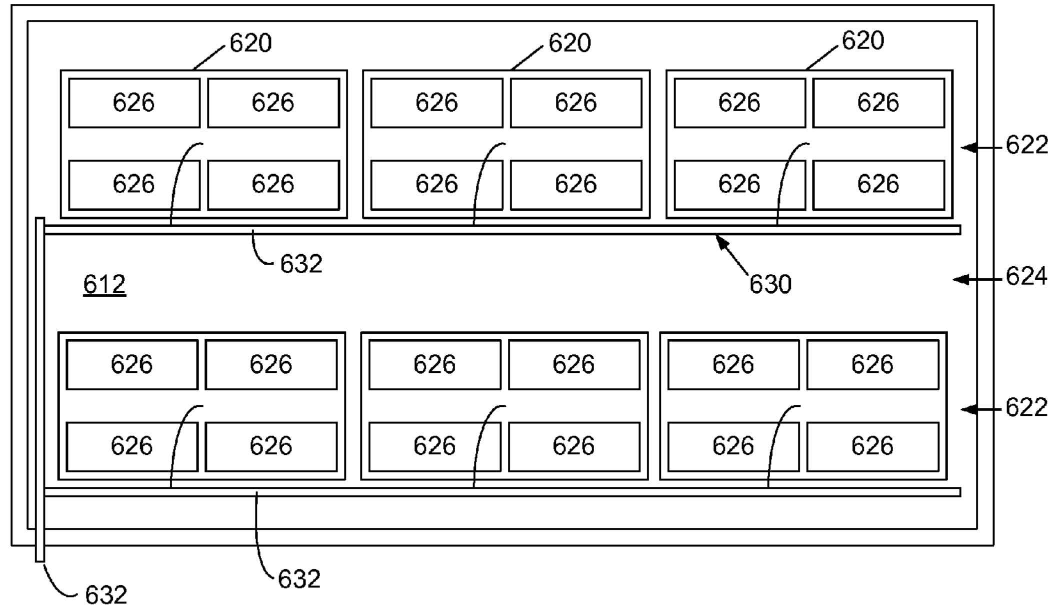

FIGS. 6A and 6B show side and plan views, respectively, that illustrate an exemplary facility 600 that serves as a computer data center. In some examples, the facility 600 is an implementation of the computer data center 101 and accordingly includes one or more of the components of the computer data center 101 in order to, for example, control a distribution of power throughout the facility 600. For example, the facility 600 can include a power distribution system (e.g., the power distribution system 100), a control system (e.g., the control system of the computer data center 101), one or more rack-mounted computers (e.g., the rack-mounted computers 103), one or more infrastructure components (e.g., the infrastructure components 105), and/or one or more IT components (e.g., the IT components 107).

In some implementations, the computer data center 400 includes IT components such as racks 626, which will be described in more detail below. In some examples, the racks 626 may include mounted fans (e.g., mounted on motherboards or the backs of the racks 626) that are a part of the infrastructure load. In some implementations, such mounted fans may not be candidates for throttling, since such fans may provide a last line of defense for cooling.

The facility 600 includes an enclosed space 612 and can occupy essentially an entire building, or be one or more rooms within a building. The enclosed space 612 is sufficiently large for installation of numerous (dozens or hundreds or thousands of) racks of computer equipment, and thus could house hundreds, thousands or tens of thousands of computers.

Modules 620 of rack-mounted computers are arranged in the space in rows 622 separated by access aisles 624. Each module 620 can include multiple racks 626, and each rack includes multiple trays 628. In general, each tray 628 can include a circuit board, such as a motherboard, on which a variety of computer-related components are mounted. A typical rack 626 is a 19" wide and 7' tall enclosure.

The facility also includes a power grid 630 which, in this implementation, includes a plurality of power distribution "lines" 632 that run parallel to the rows 622. Each power distribution line 632 includes regularly spaced power taps 634, e.g., outlets or receptacles. The power distribution lines 632 could be busbars suspended on or from a ceiling of the facility. Alternatively, busbars could be replaced by groups of outlets independently wired back to the power supply, e.g., elongated plug strips or receptacles connected to the power supply by electrical whips. As shown, each module 20 can be connected to an adjacent power tap 634, e.g., by power cabling 638. Thus, each circuit board can be connected both to the power grid, e.g., by wiring that first runs through the rack itself and the module and which is further connected by the power cabling 638 to a nearby power tap 634.

In operation, the power grid 630 is connected to a power supply, e.g., a generator or an electric utility, and supplies conventional commercial AC electrical power, e.g., 120 or 208 Volt, 60 Hz (for the United States). The power distribution lines 632 can be connected to a common electrical supply line 636, which in turn can be connected to the power supply. Optionally, some groups of power distribution lines 632 can be connected through separate electrical supply lines to the power supply.

Many other configurations are possible for the power grid. For example, the power distribution lines can have a different spacing than the rows of rack-mounted computers, the power distribution lines can be positioned over the rows of modules, or the power supply lines can run perpendicular to the rows rather than parallel.

The facility will also include cooling system to removing heat from the data center, e.g., an air conditioning system to blow cold air through the room, or cooling coils that carry a liquid coolant past the racks, and a data grid for connection to the rack-mounted computers to carry data between the computers and an external network, e.g., the Internet.

The power grid 630 typically is installed during construction of the facility 10 and before installation of the rack-mounted computers (because later installation is both disruptive to the facility and because piece-meal installation may be less cost-efficient). Thus, the size of the facility 600, the placement of the power distribution lines 632, including their spacing and length, and the physical components used for the power supply lines, need to be determined before installation of the rack-mounted computers. Similarly, capacity and configuration of the cooling system needs to be determined before installation of the rack-mounted computers. To determine these factors, the amount and density of the computing equipment to be placed in the facility can be forecast.

Before discussing power forecasting and provisioning issues, it is useful to present a typical data center power distribution hierarchy (even though the exact power distribution architecture can vary significantly from site to site).

Figures 6C, 6D:
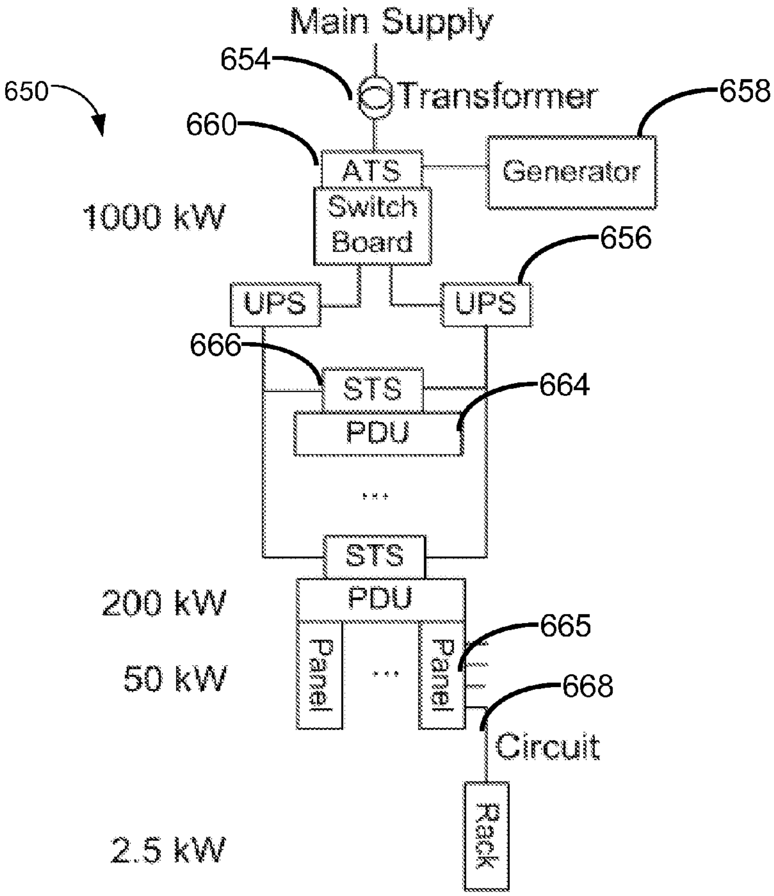
FIG. 6C is a simplified schematic of a data center power distribution hierarchy.
FIG. 6D is a schematic illustration of a graphical user interface from power usage calculation software.

FIG. 6C shows a power distribution system 650 of an exemplary Tier-2 data center facility with a total capacity of 100 KW. In some examples, the Tier-2 data center facility is an implementation of the computer data center 101 and accordingly includes one or more of the components of the computer data center 101 in order to, for example, control a distribution of power throughout the Tier-2 data center facility. For example, in some implementations, the power distribution system 650 is an implementation of the IT substation 106 and accordingly distributes power to computing devices and components that support operation thereof.

The rough capacity of the different components is shown on the left side of the figure. A medium voltage feed from a substation is first transformed by a transformer 654 down to 480 V. It is common to have an uninterruptible power supply (UPS) 656 and generator 658 combination to provide back-up power should the main power fail. The UPS 656 is responsible for conditioning power and providing short-term backup, while the generator 658 provides longer-term back-up. An automatic transfer switch (ATS) 660 switches between the generator and the mains, and supplies the rest of the hierarchy. From here, power is supplied via two independent routes in order to assure a degree of fault tolerance. Each side has its own UPS that supplies a series of power distribution units (PDUs) 664. Each PDU is paired with a static transfer switch (STS) 666 to route power from both sides and assure an uninterrupted supply should one side fail. The PDUs 664 are rated on the order of 75-200 kW each. They further transform the voltage (to 110 or 208 V in the US) and provide additional conditioning and monitoring, and include distribution panels 665 from which individual circuits 668 emerge. Circuits 668, which can include power cabling, power a rack or fraction of a rack worth of computing equipment. The group of circuits (and unillustrated busbars) provides a power grid. Thus, there can be multiple circuits per module and multiple circuits per row. Depending on the types of servers, each rack 626 can contain between 10 and 80 computing nodes, and is fed by a small number of circuits. Between 20 and 60 racks are aggregated into a PDU 664.

Power deployment restrictions generally occur at three levels: rack, PDU, and facility. (However, as shown in FIG. 2, four levels may be employed, with 2.5 KW at the rack, 50 KW at the panel, 200 KW at the PDU, and 1000 KW at the switchboard.) Enforcement of power limits can be physical or contractual in nature. Physical enforcement means that overloading of electrical circuits will cause circuit breakers to trip, and result in outages. Contractual enforcement is in the form of economic penalties for exceeding the negotiated load (power and/or energy).

Physical limits are generally used at the lower levels of the power distribution system, while contractual limits may show up at the higher levels. At the rack level, breakers protect individual power supply circuits 668, and this limits the power that can be drawn out of that circuit (in fact the National Electrical Code Article 645.5(A) limits design load to 80% of the maximum ampacity of the branch circuit). Enforcement at the circuit level is straightforward, because circuits are typically not shared between users.

At higher levels of the power distribution system, larger power units are more likely to be shared between multiple different users. The data center operator must provide the maximum rated load for each branch circuit up to the contractual limits and assure that the higher levels of the power distribution system can sustain that load. Violating one of these contracts can have steep penalties because the user may be liable for the outage of another user sharing the power distribution infrastructure. Since the operator typically does not know about the characteristics of the load and the user does not know the details of the power distribution infrastructure, both tend to be very conservative in assuring that the load stays far below the actual circuit breaker limits. If the operator and the user are the same entity, the margin between expected load and actual power capacity can be reduced, because load and infrastructure can be matched to one another.

FIG. 6D illustrates that different processing jobs may consume different amounts of power and can be classified accordingly. In this manner, if incoming requests are predicted to peak above an allowable IT power consumption level, then one or more infrastructure power loads can be throttled (e.g., reduced) in advance of such an occurrence.

FIG. 6D illustrates an example spreadsheet that relates power usage per type of application to a total power usage by a number of computing devices, or units, that process the type of application. The expected power usage per unit (e.g., per computing device such as a rack-mounted server) of a particular request can be determined in another field from a lookup table in the spreadsheet that uses the selected platform and application, and this value can be multiplied by the number of units to provide a subtotal. The lookup table can calculate the expected power usage from an expected utilization (which can be set for all records from a user-selected distribution percentile) and the power-utilization function for the combination of platform and application. Finally, the subtotals from each row can be totaled to determine the total power usage.

Once some rack-mounted computers are installed and operating, further power consumption data can be collected to refine the power planner database. In addition, the effects of planned changes, e.g., platform additions or upgrades, can be forecast.

In general, such power planning can aid in balancing the short-term and long-term usage of the facility. Although an initial server installation may not use all of the available power, the excess capacity permits equipment upgrades or installation of additional platforms for a reasonable period of time without sacrificing platform density. On the other hand, once available power has been reached, further equipment upgrades can still be performed, e.g., by decreasing the platform density (either by fewer computer per rack or by greater spacing between racks) or by using lower power applications, to compensate for the increased power consumption of the newer equipment. Such power planning also permits full utilization of the total power available to the facility, while designing power distribution components within the power distribution network with sufficient capacity to handle peak power consumption.

A number of implementations have been described. Nevertheless, it will be understood that various modifications may be made. For example, various combinations of the components described herein may be provided for implementations of similar apparatuses. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the present disclosure.

What is claimed is:

1. A method for managing power loads of a data center, comprising:

electrically coupling a data center infrastructure power load and a data center information technology (IT) power load in a data center power distribution system having a specified power capacity, the infrastructure power load comprising a plurality of infrastructure power loads associated with at least one of a data center cooling system, a data center lighting system, or a data center building management system, and the IT power load comprising a plurality of IT power loads associated with a plurality of rack-mounted computing devices in the data center;

determining that a predicted amount of the IT power load is about equal to or greater than a threshold power value;

based on the determination, throttling the infrastructure power load to reduce a portion of the power capacity used by the infrastructure power load, wherein throttling the infrastructure power load comprises:

determining an amount of power used by each of at least some of the plurality of infrastructure power loads;

ranking the determined amounts of power from highest to lowest; and reducing a power consumption of one of the at least some of the plurality of infrastructure power loads associated with the highest ranking; and based on throttling the infrastructure power load, increasing another portion of the power capacity available to the IT power load.

2. The method of claim 1, wherein a sum of a peak of the infrastructure power load and a peak of the IT power load is greater than the specified power capacity.

3. The method of claim 1, wherein reducing a power consumption of one of the at least some of the plurality of infrastructure power loads associated with the highest ranking comprises at least one of:

reducing a power consumption of a chiller with a variable frequency drive;

reducing a power consumption of a chiller by current limiting;

turning off a chiller; or reducing a power consumption of one or more lights of the data center.

4. The method of claim 1, further comprising:

subsequent to reducing the power consumption of the at least some of the plurality of infrastructure power loads associated with the highest ranking, monitoring a power draw of the infrastructure power load; and based on the monitored power draw being above a particular power draw, reducing a power consumption of another of the at least some of the plurality of infrastructure power loads associated with a next highest ranking.

5. The method of claim 4, wherein reducing a power consumption of another of the at least some of the plurality of infrastructure power loads associated with a next highest ranking comprises at least one of:

reducing a power consumption of a fan of a fan coil unit; or reducing a power consumption of a pump.

6. The method of claim 1, wherein throttling the infrastructure power load comprises reducing the infrastructure power load by an amount substantially equal to or greater than an amount that the predicted amount of the IT power load exceeds the threshold power value.

7. The method of claim 1, wherein determining that a predicted amount of the IT power load is about equal to or greater than a threshold power value comprises:

collecting historical data associated with the plurality of IT power loads; and determining the threshold power value based on the collected historical data.

8. The method of claim 7, wherein the historical data comprises power usage data of the plurality of IT loads that is grouped in a plurality of time segments, the time segments comprising at least one of hours, days, weeks, or months.

9. The method of claim 1, wherein determining that a predicted amount of the IT power load is about equal to or greater than a threshold power value comprises:

monitoring ambient conditions external to the data center; and determining the threshold power value based on the monitored ambient conditions.

10. The method of claim 9, further comprising:

installing an additional plurality of rack-mounted computing devices in the data center based on the monitored ambient conditions.

11. The method of claim 1, wherein determining that a predicted amount of the IT power load is about equal to or greater than a threshold power value comprises:

monitoring a plurality of computing loads received at the data center for processing by the plurality of rack-mounted computing devices;

determining a required power usage to process the monitored plurality of computing loads; and prior to processing the monitored plurality of computing loads, determining that the IT power load that includes the required power usage, at least in part, exceeds the threshold power value.

12. The method of claim 1, further comprising:

subsequent to a specified time duration after throttling the infrastructure power load to reduce the portion of the power capacity used by the infrastructure power load, increasing the infrastructure power load.

13. The method of claim 1, further comprising:

subsequent to increasing another portion of the power capacity available to the IT power load, monitoring an increased IT power load that is about equal to or greater than the threshold power value;

determining that the IT power load is reduced to below the threshold power value; and increasing the infrastructure power load based on the reduced IT power load.

14. A data center power system, comprising:

a power distribution assembly that comprises an input operable to electrically couple to a high voltage power source, the power distribution assembly comprising a specified power capacity;

a data center infrastructure power load that is electrically coupled to the power distribution assembly and comprises a plurality of infrastructure power loads associated with at least one of a data center cooling system, a data center lighting system, or a data center building management system;

a data center information technology (IT) power load that is electrically coupled to the power distribution assembly and the infrastructure power load, the IT power load comprising a plurality of IT power loads associated with a plurality of rack-mounted computing devices in the data center; and a control system communicably coupled to the power distribution system, the control system operable to perform operations comprising:

determining that a predicted amount of the IT power load is about equal to or greater than a threshold power value;

based on the determination, throttling the infrastructure power load to reduce a portion of the power capacity used by the infrastructure power load, wherein performing the operation of throttling the infrastructure power load comprises:

determining an amount of power used by each of at least some of the plurality of infrastructure power loads;

ranking the determined amounts of power from highest to lowest; and reducing a power consumption of one of the at least some of the plurality of infrastructure power loads associated with the highest ranking; and based on throttling the infrastructure power load, increasing another portion of the power capacity available to the IT power load.

15. The data center power system of claim 14, wherein the power distribution assembly comprises a plurality of power busses, each of the plurality of power busses electrically coupled to a portion of the plurality of infrastructure power loads and a portion of the plurality of IT power loads.

16. The data center power system of claim 14, wherein a sum of a peak of the infrastructure power load and a peak of the IT power load is greater than the specified power capacity.

17. The data center power system of claim 14, wherein performing the operation of reducing a power consumption of one of the at least some of the plurality of infrastructure power loads associated with the highest ranking comprises performing at least one of:

reducing a power consumption of a chiller with a variable frequency drive;

reducing a power consumption of a chiller by current limiting;

turning off a chiller; or reducing a power consumption of one or more lights of the data center.

18. The data center power system of claim 14, wherein the control system is further operable to perform operations comprising:

subsequent to reducing the power consumption of the at least some of the plurality of infrastructure power loads associated with the highest ranking, monitoring a power draw of the infrastructure power load; and based on the monitored power draw being above a particular power draw, reducing a power consumption of another of the at least some of the plurality of infrastructure power loads associated with a next highest ranking.

19. The data center power system of claim 18, wherein performing the operation of reducing a power consumption of another of the at least some of the plurality of infrastructure power loads associated with a next highest ranking comprises performing at least one of:

reducing a power consumption of a fan of a fan coil unit; or reducing a power consumption of a pump.

20. The data center power system of claim 14, wherein performing the operation of throttling the infrastructure power load comprises reducing the infrastructure power load by an amount substantially equal to or greater than an amount that the predicted amount of the IT power load exceeds the threshold power value.

21. The data center power system of claim 14, wherein performing the operation of determining that a predicted amount of the IT power load is about equal to or greater than a threshold power value comprises:

collecting historical data associated with the plurality of IT power loads; and determining the threshold power value based on the collected historical data.

22. The data center power system of claim 21, wherein the historical data comprises power usage data of the plurality of IT loads that is grouped in a plurality of time segments, the time segments comprising at least one of hours, days, weeks, or months.

23. The data center power system of claim 14, wherein performing the operation of determining that a predicted amount of the IT power load is about equal to or greater than a threshold power value comprises:

monitoring ambient conditions external to the data center; and determining the threshold power value based on the monitored ambient conditions.

24. The data center power system of claim 14, wherein performing the operation of determining that a predicted amount of the IT power load is about equal to or greater than a threshold power value comprises:

monitoring a plurality of computing loads received at the data center for processing by the plurality of rack-mounted computing devices;

determining a required power usage to process the monitored plurality of computing loads; and prior to processing the monitored plurality of computing loads, determining that the IT power load that includes the required power usage, at least in part, exceeds the threshold power value.

* * * * *